United States Patent
Lytle et al.

(10) Patent No.: US 7,566,176 B2
(45) Date of Patent: Jul. 28, 2009

(54) FIBER-OPTIC ENDFACE CLEANING APPARATUS AND METHOD

(75) Inventors: Steve Lytle, Mill Creek, WA (US); Kevin G. Cassady, Monroe, WA (US); Gregory J. Gerhard, Seattle, WA (US)

(73) Assignee: Westover Scientific, Inc., Mill Creek, WA (US)

( * ) Notice: Subject to any disclaimer, the term of this patent is extended or adjusted under 35 U.S.C. 154(b) by 0 days.

(21) Appl. No.: 11/764,697

(22) Filed: Jun. 18, 2007

(65) Prior Publication Data
US 2008/0152284 A1  Jun. 26, 2008

Related U.S. Application Data

(60) Division of application No. 10/428,954, filed on May 1, 2003, now Pat. No. 7,232,262, which is a continuation-in-part of application No. 10/199,925, filed on Jul. 18, 2002, now Pat. No. 6,821,025.

(51) Int. Cl.
*G02B 6/36* (2006.01)
*G02B 6/38* (2006.01)
*G02B 6/00* (2006.01)

(52) U.S. Cl. .............. 385/85; 385/53; 385/73; 385/76; 385/77; 385/78; 385/134; 385/141; 385/147

(58) Field of Classification Search .......... 385/85, 385/53, 73, 76, 77, 78, 134, 141, 147
See application file for complete search history.

(56) References Cited

U.S. PATENT DOCUMENTS

| | | |
|---|---|---|
| 1,796,338 A | 3/1931 | Moore |
| 1,939,612 A | 12/1933 | Rose |
| 2,218,738 A | 10/1940 | Boysen |
| 2,318,365 A | 5/1943 | Boysen |
| 2,616,820 A | 11/1952 | Bourgeaux |
| 2,851,008 A | 9/1958 | Rochester |
| 3,118,163 A | 1/1964 | Abberly |
| 3,319,281 A | 5/1967 | Montgomery |
| 3,694,845 A | 10/1972 | Engelsher |
| 3,708,818 A | 1/1973 | Hotz |
| 3,998,012 A | 12/1976 | Ness |
| 4,028,162 A | 6/1977 | Cherin |
| 4,045,121 A | 8/1977 | Clark |
| 4,065,409 A | 12/1977 | Flanagan |

(Continued)

*Primary Examiner*—Charlie Peng
*Assistant Examiner*—Hung Lam
(74) *Attorney, Agent, or Firm*—Matthew A. Pequignot; Pequignot + Myers LLC

(57) ABSTRACT

A cleaning apparatus (1100) for cleaning an endface (1104) of an optical fiber (1106), wherein a portion of the optical fiber is contained within an interface device (1103) is provided. The cleaning apparatus includes a housing (1114) having an interface portion (1124) adapted to be received by the interface device. The cleaning apparatus further includes a fluid dispensing assembly (1116) at least partially disposed within the housing, wherein at least a portion (1112) of the fluid dispensing assembly engages the endface when the interface portion is received by the interface device. The fluid dispensing assembly is operable to deliver a fluid and a solvent upon the endface when the interface portion of the housing is received by the interface device to aid in the removal of contaminants on the endface. The cleaning apparatus may include a contact cleaning assembly (1304) and/or a microscope (1408).

9 Claims, 16 Drawing Sheets

U.S. PATENT DOCUMENTS

| | | | | |
|---|---|---|---|---|
| 4,077,702 | A | 3/1978 | Kunze | |
| 4,148,559 | A | 4/1979 | Gauthier | |
| 4,218,133 | A | 8/1980 | Biedermann | |
| 4,263,692 | A | 4/1981 | Gremillion | |
| 4,322,127 | A | 3/1982 | Comerford | |
| 4,428,092 | A | 1/1984 | Lipari | |
| 4,604,649 | A | 8/1986 | Carollo | |
| 4,637,089 | A | 1/1987 | Schwarz | |
| 4,733,428 | A * | 3/1988 | Malinge et al. | 15/302 |
| 4,767,180 | A | 8/1988 | Zajac | |
| 4,785,586 | A | 11/1988 | Kratfel | |
| 4,816,951 | A | 3/1989 | Zago | |
| 4,850,536 | A | 7/1989 | Teranishi | |
| 4,901,142 | A | 2/1990 | Ikuno | |
| 4,998,672 | A | 3/1991 | Bordaz | |
| 5,023,464 | A | 6/1991 | Mitsuya | |
| 5,080,461 | A | 1/1992 | Pimpinella | |
| 5,117,528 | A | 6/1992 | Kanayama | |
| 5,135,590 | A | 8/1992 | Basavanhally | |
| 5,144,775 | A | 9/1992 | Bakanowsky, III | |
| 5,148,572 | A | 9/1992 | Wells | |
| 5,151,964 | A | 9/1992 | Carpenter | |
| 5,210,647 | A | 5/1993 | Hartnagel | |
| 5,220,703 | A | 6/1993 | Kanayama | |
| 5,226,101 | A | 7/1993 | Szentesi | |
| 5,230,032 | A | 7/1993 | Muzslay | |
| 5,281,301 | A | 1/1994 | Basavanhally | |
| 5,317,661 | A | 5/1994 | Szentesi | |
| 5,325,452 | A | 6/1994 | Stein | |
| 5,332,157 | A * | 7/1994 | Proctor | 239/304 |
| 5,376,446 | A | 12/1994 | Huang | |
| 5,381,498 | A | 1/1995 | Bylander | |
| 5,381,504 | A | 1/1995 | Novack | |
| 5,472,119 | A | 12/1995 | Park | |
| 5,487,398 | A | 1/1996 | Ohmi | |
| 5,557,696 | A | 9/1996 | Stein | |
| 5,573,015 | A | 11/1996 | Williams | |
| 5,730,162 | A | 3/1998 | Shindo | |
| 5,734,768 | A | 3/1998 | Kim | |
| 5,743,468 | A | 4/1998 | Laidler | |
| 5,761,758 | A | 6/1998 | Mellon | |
| 5,762,238 | A | 6/1998 | Liang | |
| 5,768,738 | A | 6/1998 | Lee | |
| 5,817,185 | A | 10/1998 | Shindo | |
| 5,836,031 | A | 11/1998 | Cox | |
| 5,863,211 | A | 1/1999 | Sobotta | |
| 5,878,458 | A | 3/1999 | Higginbotham | |
| 5,906,686 | A | 5/1999 | McNeil | |
| 5,922,141 | A * | 7/1999 | Darsey | 134/15 |
| 5,925,191 | A | 7/1999 | Stein et al. | |
| 5,956,793 | A | 9/1999 | Cox | |
| 6,006,768 | A | 12/1999 | Cox | |
| 6,053,985 | A | 4/2000 | Cheswick | |
| 6,125,227 | A | 9/2000 | Cox | |
| 6,209,162 | B1 | 4/2001 | Clairadin | |
| 6,209,163 | B1 | 4/2001 | Clairadin | |
| 6,347,974 | B1 | 2/2002 | Chandler | |
| 6,619,854 | B2 | 9/2003 | Kiani | |
| 6,619,954 | B2 | 9/2003 | Cheney | |
| 6,719,561 | B2 | 4/2004 | Gugel | |
| 6,821,025 | B2 | 11/2004 | Gerhard | |
| 7,209,625 | B2 * | 4/2007 | Juergen et al. | 385/134 |
| 7,232,262 | B2 | 6/2007 | Lytle | |
| 2002/0006261 | A1 | 1/2002 | Krow, Jr. | |
| 2003/0169991 | A1 | 9/2003 | Malevanets | |
| 2003/0221706 | A1 | 12/2003 | Kiani | |

\* cited by examiner

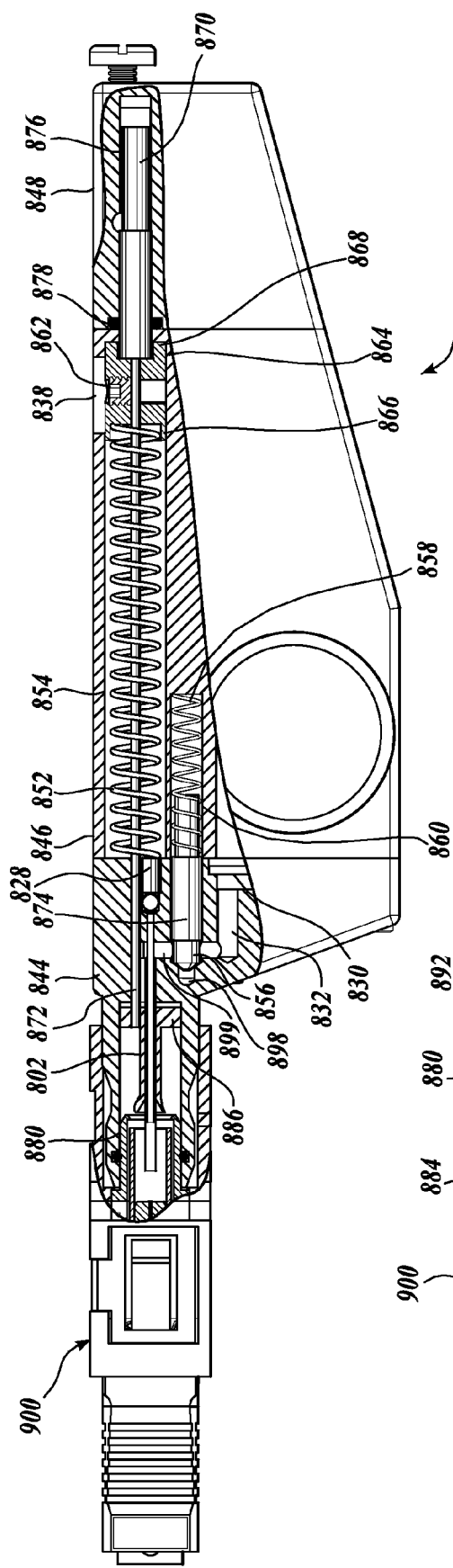
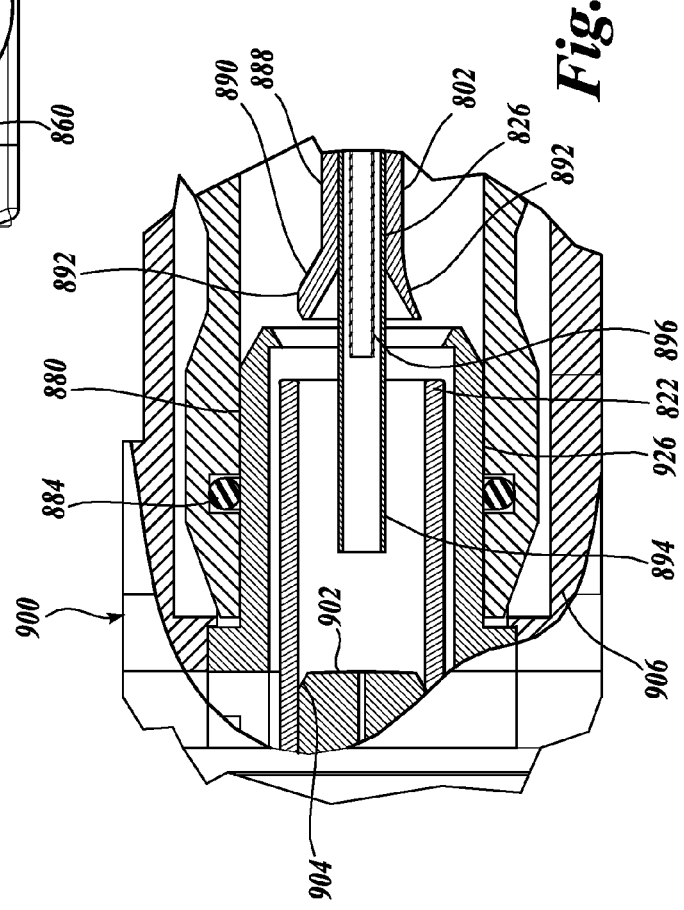
Fig. 8.
Fig. 9.

FIBER-OPTIC ENDFACE CLEANING APPARATUS AND METHOD

CROSS-REFERENCE(S) TO RELATED APPLICATION(S)

This application is a division of U.S. application Ser. No. 10/428,954, filed May 1, 2003, which is a continuation-in-part of U.S. application Ser. No. 10/199,925, filed Jul. 18, 2002, now U.S. Pat. No. 6,821,025, issued Nov. 23, 2004, the disclosure of which is hereby expressly incorporated by reference in its entirety, and priority from the filing date of which is hereby claimed under 35 U.S.C. § 120.

FIELD OF THE INVENTION

The present invention relates generally to fiber-optic cleaning systems and, more specifically, to cleaning systems for cleaning fiber-optic endfaces.

BACKGROUND OF THE INVENTION

The proliferation of fiber-optic communications has led to its widespread implementation and use in industry, especially in the fields of telecommunications and data communications. It is well known in the industry that fiber-optic endfaces must be kept clean and undamaged within fiber-optic communication systems. A fiber-optic endface is the cross-sectional surface that is created when an optical fiber is cut for termination. The fiber-optic endfaces are typically supported by a connector that couples to a bulkhead adapter (also sometimes referred to as a backplane adapter or a mating adapter) having an alignment sleeve for receiving the fiber-optic endface.

Failure to keep an endface clean and undamaged results in signal loss because of scattering effects at the endface of the optical fiber. As bandwidths increase, particularly with the rise of wavelength division multiplexing (WDM) technology, the need for cleanliness at the fiber-optic endface is even more important. Further, since fiber-optic communication systems handle heavy bandwidth traffic, the cleanliness at the fiber-optic endface is particularly important because the laser power driving the fiber-optic communication signals is typically higher. When a high-powered laser strikes a small piece of debris on the fiber-optic endface, the debris burns, leaving a film of soot on the fiber-optic endface that degrades communication signals. As a result, the "dirty" fiber-optic endface at the interconnect point must be taken out of service and repaired.

While cleanliness of the fibers is of utmost importance, access to the fiber endface is often very limited. Most fiber-optic interconnects are arranged in a male-to-male configuration and utilize a female-to-female configured alignment sleeve for coupling. Thus, when the user-side connector is removed, one endface is readily accessible, while the other resides at the bottom of a deep narrow hole. This makes cleaning very difficult. Further, backplane fiber-optic interconnects are notoriously difficult to access for maintenance, cleaning, and repair. Whether multi-fiber or single-fiber (simplex), these fiber-optic connectors are typically located near the back of a narrow "card slot." A typical slot is 1.5 inches wide and 12 inches deep, and rather difficult to access for service. Most current cleaning techniques require the user to disassemble the backplane to gain access to the connector for cleaning.

To overcome the access problem, some cleaning system manufacturers have designed cleaning systems that are insertable within the alignment sleeve for cleaning the fiber-optic endfaces without necessitating the removal of the connector from the bulkhead adapter. However, the methods used by these systems are disadvantageous for several reasons. For instance, most of these methods utilize contact cleaning methods, wherein the endface is directly contacted by a non-fluid material, such as a cotton swab or a physical structure coated with an adhesive. Because the fiber-optic endface is directly contacted by a non-fluid material, these systems contain the inherent risk of adding contamination to the fiber-optic endface as a portion of the non-fluid contact material may remain on the fiber-optic endface. Further, the physical contact may result in the introduction of defects upon the fiber-optic endface, such as scratches on the fiber-optic endface through "dragging" of a contaminate particle across the endface. Thus, it is widely understood that contact cleaning methods are one cause of endface scratching, which often results in signal degradation.

Other cleaning manufacturers have designed cleaning systems that involve injecting a liquid within the bulkhead adapter for cleaning the fiber-optic endfaces without necessitating the removal of the connector from the backplane. However, current methods of this nature are also disadvantageous for several reasons. For instance, a typical bulkhead adapter is not watertight, therefore significant quantities of the liquid, such as water, are leaked from the bulkhead adapter, thereby presenting a potential or a perceived potential for damage to the expensive communication equipment located in proximity to the connector. Further, these systems do not provide an immediate evacuation system for the rapid removal of the liquid injected within the bulkhead adapter, thus increasing the potential for damage to the surrounding communications equipment and increasing the potential for residuals of the fluid to remain on the endface, thus contaminating the endface.

Moreover, it has been found that during cleaning operations, cleaning solvents may collect in a chamfer formed in the fiber-optic endface. The chamfer is located around the periphery of the fiber-optic endface. The chamfer acts as a protected cavity, which ultimately forms a reservoir that retains solvent within the alignment sleeve. Thus, after the cleaning process is complete, the cleaning solvent and any contaminants contained in the chamfer often flow back onto the fiber-optic endface, recontaminating the endface.

Further, existing assemblies do not incorporate an inspection microscope within the endface cleaning apparatus or a means to receive one. Thus, the cycle time to clean and inspect a fiber-optic endface is increased since the operator is forced to swap between the endface cleaning apparatus and an inspection microscope. Further still, the potential for the introduction of contaminants or damage to the fiber endface due to the repetitive coupling and decoupling of the endface cleaning apparatus and inspection microscope during the cleaning process is also substantially increased. In other aspects, a manufacturer must design/develop separate tooling to produce and inventory two separate units, a endface cleaning apparatus and a microscope, resulting in increased costs relative to a combined unit.

Further still, existing assemblies do not incorporate a contact cleaning assembly with a non-contact cleaning assembly, such that if the non-contact cleaning process is not completely effective, the aggressiveness of the cleaning operation can be increased by incorporating contact cleaning methods into the cleaning process.

Therefore, a need exists for a endface cleaning apparatus that is effective in cleaning fiber-optic endfaces while exhibiting a reduced potential of contamination introduction and/or damage to the fiber-optic endface being cleaned and does not expose nearby components to rogue fluids. Further, there exists a need for a endface cleaning apparatus that is operable to receive or contains a microscope therewithin to reduce the cleaning process cycle time and risk of fiber-optic endface contamination.

SUMMARY OF THE INVENTION

One embodiment of a cleaning apparatus formed in accordance with the present invention is provided. The cleaning apparatus is operable for use in cleaning an endface of an optical fiber, wherein a portion of the optical fiber is contained within an interface device. The cleaning apparatus includes a housing and a fluid dispensing assembly at least partially disposed within the housing. The fluid dispensing assembly includes an interface portion adapted to be received by the interface device and engage the endface. The fluid dispensing assembly is operable to deliver a fluid and a solvent upon the endface to aid in removal of contaminants on the endface.

A first alternate embodiment of a cleaning apparatus formed in accordance with the present invention is provided. The cleaning apparatus is operable for use in cleaning an endface of an optical fiber. The cleaning apparatus includes a housing and a first attachment device coupled to the housing. The first attachment device is adapted to permit the selective coupling of a container of fluid to the housing. The cleaning apparatus also includes a second attachment device coupled to the housing, the second attachment device adapted to permit the selective coupling of a container of solvent to the housing. The cleaning apparatus also includes a fluid dispensing assembly at least partially disposed within the housing and in fluid communication with each of the containers, the fluid dispensing assembly operable to deliver the fluid and the solvent from each of the containers upon the endface to aid in the removal of contaminants on the endface.

A second alternate embodiment of a cleaning apparatus formed in accordance with the present invention is provided. The cleaning apparatus is operable for use in cleaning an endface of an optical fiber. The cleaning apparatus includes a housing and a fluid dispensing assembly coupled to the housing and operable to deliver a fluid and a solvent upon the endface to aid in the removal of contaminants on the endface. The cleaning apparatus further includes a contact cleaning assembly coupled to the housing, the contact cleaning assembly having an engagement member operable to engage the endface and dislodge contaminants on the endface through physical contact.

A third alternate embodiment of a cleaning apparatus formed in accordance with the present invention is provided. The cleaning apparatus is operable for use in cleaning an endface of an optical fiber, wherein a portion of the optical fiber is contained within an interface device. The cleaning apparatus includes a contact cleaning assembly, wherein the contact cleaning assembly includes an interface portion configured to be at least partially received within an interface device. The contact cleaning assembly further includes an engagement member coupled to the interface portion and adapted to engage the endface and remove contaminates on the endface through physical contact. The cleaning apparatus further includes a drive mechanism coupled to the contact cleaning assembly, the drive mechanism adapted to move the engagement member upon the endface.

A fourth alternate embodiment of a cleaning apparatus formed in accordance with the present invention is provided. The cleaning apparatus is operable for use in cleaning a first endface of a first optical fiber and a second endface of a second optical fiber, wherein a portion of each of the first and second optical fibers are contained within an interface device. The cleaning apparatus includes a housing and a fluid dispensing assembly at least partially disposed within the housing. The fluid dispensing assembly includes a first interface portion and a second interface portion, the first and second interface portions adapted to be received by the interface device. The fluid dispensing assembly is operable to deliver a fluid and a solvent via the first and second interface portions upon the first and second endfaces to aid in the removal of contaminants on the first and second endfaces.

One embodiment of a method formed in accordance with the present invention for cleaning an endface of an optical fiber contained within an interface device is provided. The method includes the step of inserting an interface portion of a cleaning apparatus within the interface device so as to position a nozzle in proximity to the endface. The method further includes the steps of intermixing a solvent with the fluid; and dislodging contaminates from the endface through contacting the endface with an engagement member.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 8 is a side view of the alternate embodiment of the fiber-optic endface cleaning apparatus depicted in FIG. 6 coupled to a fiber-optic bulkhead adapter, with a portion of the fiber-optic endface cleaning apparatus and fiber-optic connector shown in cross-section, revealing a baffle depicted in a retracted position;

FIG. 9 is a fragmentary cross-sectional view of the alternate embodiment of FIG. 8, showing a magnified perspective of the baffle in a retracted position;

DETAILED DESCRIPTION OF THE PREFERRED EMBODIMENT

The present invention is a fiber-optic endface cleaning apparatus for cleaning the endface of an optical fiber. While not limited to the following application, the endface cleaning apparatus of the present invention is particularly suitable for cleaning an endface of an optical fiber contained in an interface device, which is defined as any assembly, device, or apparatus having an exposed fiber-optic endface therein or supported thereby. Examples of such an interface device include any one or more, or combination of, the following: an alignment sleeve, bulkhead adapter, transceiver, transmitter, detector, or connector. A bulkhead adapter is also sometimes referred to as a "mating adapter" or a "backplane adapter," and their design and configurations vary greatly. For illustrative purposes only, the embodiments of the present invention will be described either in relation to a fiber-optic connector contained within a bulkhead adapter, or alternately, in relation to a fiber-optic connector that has been removed from the bulkhead adapter. However, it should be apparent to one skilled in the art that the fiber-optic endface cleaning apparatus may be used in any situation where an exposed fiber-optic endface is present.

In general, and as will be further described below, the fiber-optic endface cleaning apparatus includes a system for applying a pressurized fluid and a cleaning solvent upon a fiber-optic endface. In other embodiments of the present invention, the fiber-optic endface cleaning apparatus is operable to receive or includes a microscope for illuminating and viewing the endfaces of optical fibers. In still yet another embodiment of the present invention, the fiber-optic endface cleaning apparatus includes a retractable baffle for aiding in the removal of fluids from the fiber-optic endface. In additional embodiments, the fiber-optic endface cleaning apparatus includes a contact cleaning assembly, the contact cleaning assembly having an engagement member adapted to contact and dislodge contaminates from the endface through physical contact. In further embodiments, the endface cleaning apparatus is adapted to removably couple to a container of pressurized fluid and a container of solvent.

Figure 1:
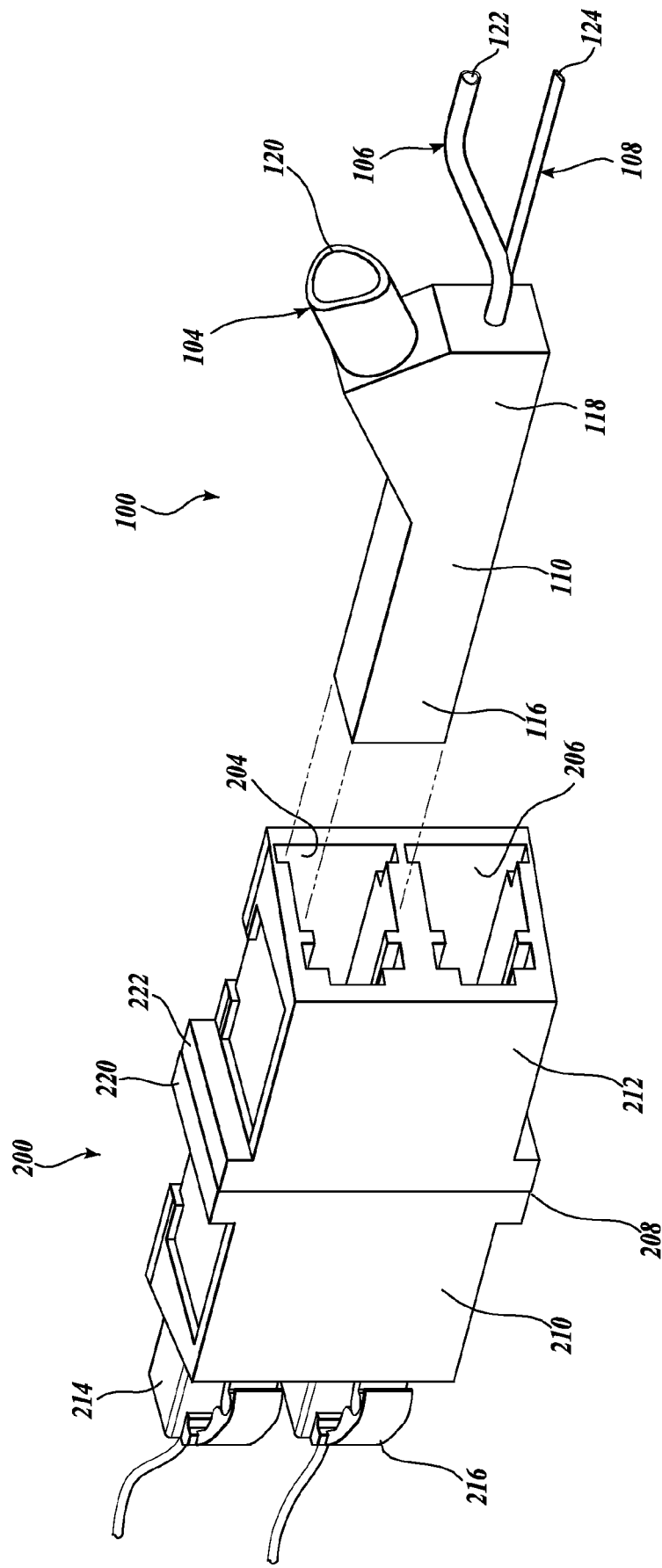
FIG. 1 is a perspective view of one embodiment of a fiber-optic endface cleaning apparatus formed in accordance with the present invention, additionally showing a fiber-optic bulkhead adapter with two connectors coupled thereto, of which the fiber-optic endface cleaning apparatus is operable to interface with and clean the endfaces of the fiber-optic cables contained therein.
Figure 2:
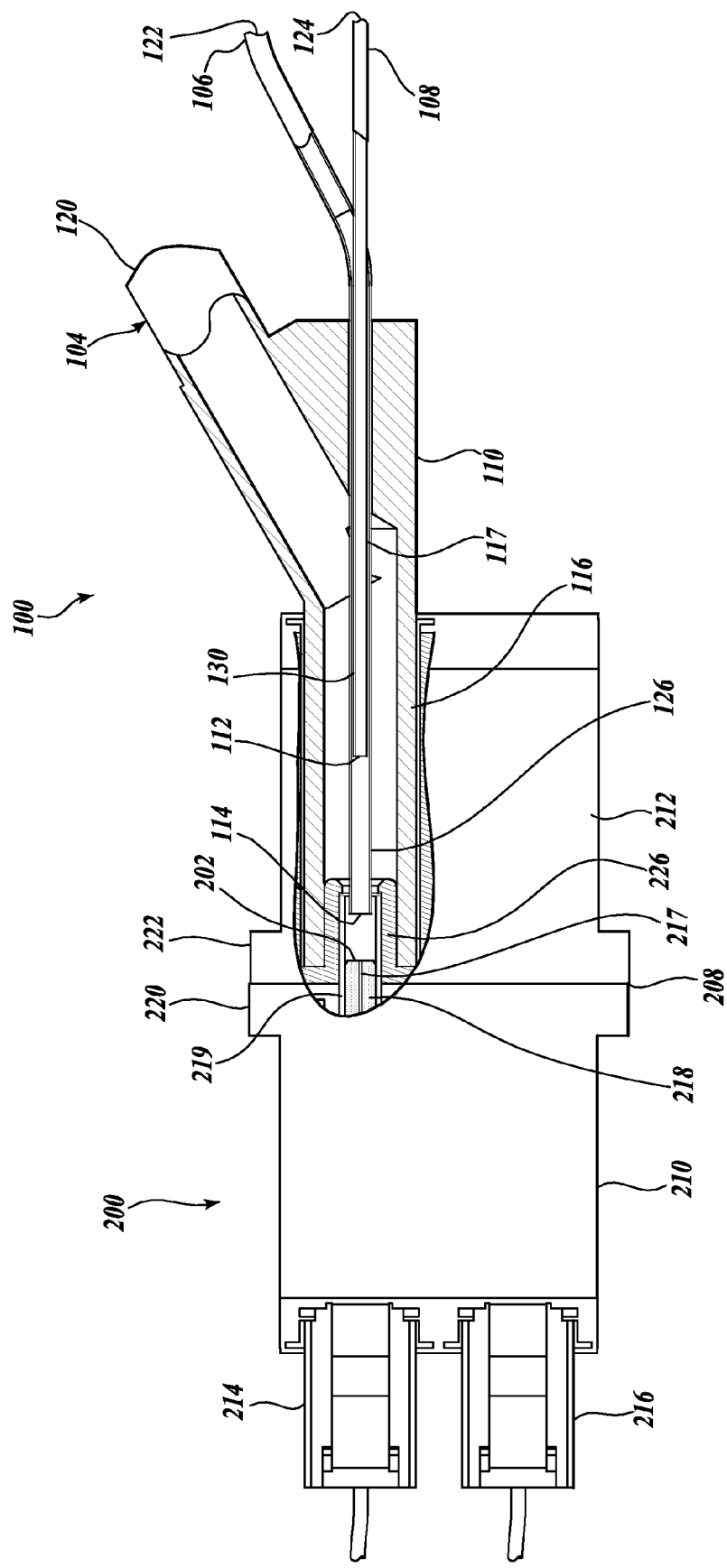
FIG. 2 is a planar fragmentary sectional view of the fiber-optic endface cleaning apparatus, the bulkhead adapter and fiber-optic connectors depicted in FIG. 1, wherein the fiber-optic endface cleaning apparatus is shown inserted within the bulkhead adapter.

FIGS. 1 and 2 illustrate one embodiment of a fiber-optic endface cleaning apparatus 100 formed in accordance with the present invention. The fiber-optic endface cleaning apparatus 100 is capable of interfacing with a fiber-optic bulkhead adapter 200, such as those typically used in well known fiber-optics data transmission systems, to clean the endfaces of the optical fibers contained therein. The fiber-optic endface cleaning apparatus 100 includes a housing 110, an evacuation system 104, a cleaning solvent delivery system 106, and a pressurized fluid delivery system 108.

Inasmuch as the fiber-optic endface cleaning apparatus 100 will be better understood in light of a description of the fiber-optic bulkhead adapter 200 that the endface cleaning apparatus 100 interfaces with, a detailed description of the fiber-optic bulkhead adapter 200 will precede a discussion of the fiber-optic endface cleaning apparatus 100. The illustrated fiber-optic bulkhead adapter 200 is suitable for use in most well-known fiber-optics data transmission systems. The fiber-optic bulkhead adapter 200 typically includes a first pair of female inputs 204 and 206 located on a first end of the bulkhead adapter 200. The female inputs 204 and 206 are aligned with a second pair of female inputs (not shown) facing in an opposite direction relative to the first pair of female inputs 204 and 206 on a second end of the bulkhead adapter 200. The female inputs 204 and 206 are sized and configured to receive fiber-optic connectors, such as those referenced by numerals 214 and 216 therewithin. When fiber-optic connectors are received within aligned, opposing female inputs, the optical fibers 217 (one shown) contained within the opposing fiber-optic connectors are received within an alignment sleeve 219 housed within the bulkhead adapter 200. With the connectors received as described, the endfaces of the opposing fiber-optic connectors face one another within the alignment sleeve 219 to permit the passage of optical signals between the optical fibers, as is well known in the art.

In a typical application, the bulkhead adapter 200 is mounted through a bulkhead (not shown) to allow the connection of the optical fibers through the bulkhead. Therefore, while the fiber-optic connectors received within female inputs 204 and 206 may be easily accessed and removed by a user, access to the fiber-optic connectors 214 and 216 is typically blocked by the bulkhead. For instance, the bulkhead adapter 200 may allow passage of the optical fibers through the bulkhead of an amplification unit, wherein to "unplug" the fiber-optic connectors 214 and 216 from the bulkhead adapter 200, one would need to disassemble the amplification unit to access the fiber-optic connectors 214 and 216, a process that is labor intensive and associated with a high potential for equipment damage.

Once the fiber-optic connectors 214 and 216 are inserted into the bulkhead adapter 200, the fiber-optic endfaces 202 associated with each connector are exposed to the other side of the bulkhead and are ready to interface with another fiber-optic connector. In practice, once a fiber-optic connector is removed from one of the female inputs 204 or 206, the fiber-optic endface cleaning apparatus 100 of the present invention may be inserted into the empty female input 204 or 206. The fiber-optic endface cleaning apparatus 100 may then be used for cleaning the endfaces 202 of each fiber-optic strand 217 terminated within the fiber-optic bulkhead adapter 200.

Still referring to FIGS. 1 and 2 and focusing on the structure of the bulkhead adapter, the fiber-optic bulkhead adapter 200 has an alignment sleeve 219 mounted inside each aligned, opposing pairs of female inputs to receive, retain, and align the optical fibers associated with the fiber-optic connectors received by the female inputs. The fiber-optic connectors 214 and 216 include a ferrule 218 that houses the optical fiber 217 therewithin. The ferrule 218 serves to protect the optical fiber 217 and align the optical fiber 217 within the bulkhead adapter 200 through engagement of the ferrule 218 with the alignment sleeve 219.

The endface 202 of a terminated optical fiber is cut and polished to a high degree of precision for purposes of optimizing signal propagation. Each fiber-optic endface 202 is either "flat" (i.e., orthogonal to the optical axis of the fiber) or cut at an angle. Preferably, each fiber-optic endface 202 is cut at an angle of 8° from vertical (plus or minus 0.1°) to reduce signal degradation caused by reflection.

Many bulkhead adapters 200 are duplex in design, such as shown in FIGS. 1 and 2 allowing for a send and receive channel within a single housing. It should be apparent to one skilled in the art, however, that simplex bulkhead adapters are also quite common and suitable for use in conjunction with the present invention, as well as multiplexes exceeding two.

The bulkhead adapter 200 may include a split housing 208, female inputs 204 and 206 at each end for receiving fiber-optic connectors, such as those referenced by numerals 214 and 216, therewithin. The split housing 208 is generally an elongate hollow block structure formed by joining a first housing half 210 to a second housing half 212 along a pair of opposing mating flanges 220 and 222. Mounted within is the alignment sleeve 219 into which the ferrule 218, and optical fiber 217 are retained and aligned.

In light of the above discussion of the fiber-optic bulkhead adapter 200, the fiber-optic endface cleaning apparatus 100 will now be discussed. As stated above, the fiber-optic endface cleaning apparatus 100 includes the housing 110, the evacuation system 104, the cleaning solvent delivery system 106, and the pressurized fluid delivery system 108. The housing 110 is comprised of an interface portion 116 coupled to or integrally formed with a tubing receiving portion 118. The interface portion 116 is a hollow elongate block structure having outer dimensions substantially similar to the inner dimensions of the female inputs 204 and 206 of the fiber-optic bulkhead adapter 200 to allow the insertion of the interface portion 116 therein. The interface portion 116 is configured to orient the components of the cleaning solvent delivery system 106 and the pressurized fluid delivery system 108 contained within the interface portion 116 so that any fluid discharged therefrom will properly impinge the fiber-optic endfaces 202, as will be discussed in further detail below.

Joined to the interface portion 116 is the tubing receiving portion 118. The evacuation passageway 120, cleaning solvent tubing 122, and pressurized fluid tubing 124 pass through the tubing receiving portion 118. The tubing receiving portion 118 is a triangular block structure, preferably solid in construction with exception of the tubing passing therethrough.

The evacuation system 104 is comprised of the evacuation passageway 120 coupled to a vacuum pump (not shown) by well known flexible tubing (not shown.) The vacuum pump may be any well known pump that has sufficient capacity to maintain a negative pressure within the alignment sleeve 219 during cleaning, despite the injection of a pressurized fluid therein. One such vacuum pump suitable for use with the present invention is a single stage venturi pump, Model No. AVR046H, manufactured by Air-Vac, located in Seymour, Conn. The pump is capable of producing vacuum flow rates up to 118 ml/sec. Preferably, a low level of vacuum is applied to mitigate the entrance of contaminants exterior of the connector through infiltrating cracks or other openings in the connector.

The evacuation passageway 120 passes through the tubing receiving portion 118 of the housing 110 at an angle relative to the horizontally oriented interface portion 116 of the housing 110. As the evacuation passageway 120 passes through the interface portion 116 of the housing 110, the evacuation passageway 120 is defined by the inner walls of the interface portion 116 of the housing 110. In the embodiment illustrated, the inner diameter of the evacuation passageway 120 within the interface portion 116 is equal to the outer dimensions of a protective housing 226 that encompasses the alignment sleeve 219 and related fiber-optic endfaces 202, although any diameter that allows adequate volume flow is acceptable. Although an evacuation system is depicted and described, it should be apparent to those skilled in the art, the evacuation system 104 is optional, and the fiber-optic endface cleaning apparatus 100 may be effectively used without an evacuation system.

The pressurized fluid delivery system 108 is comprised of a fluid pressurization unit (not shown), the pressurized fluid tubing 124, and a pressurized fluid nozzle 130. The fluid pressurization unit delivers a pressurized fluid via flexible tubing (not shown) to the pressurized fluid tubing 124 for discharge from the pressurized fluid nozzle 130. The fluid pressurization unit may be any well known pump or other source that has a sufficient capacity to maintain sufficient flow under sufficient pressure during cleaning. In the illustrated embodiment, a pressurized fluid is delivered within a range of 15 psi to substantially greater values, with a preferred value of 100 psi, for three seconds at a flow rate of 112 ml/sec.

In one embodiment, the pressurized fluid is a pressurized gas provided by selectively releasing pressurized nitrogen from well known commercially available pressurized nitrogen bottles. In another embodiment, the fluid is a pressurized gas such as dry filtered air provided by a well known compressor or pump. In still another embodiment, the pressurized fluid is $CO_2$. In yet another embodiment, the pressurized fluid is deionized air. Although in the illustrated embodiment, the pressurized fluid is described as either nitrogen, air, deionized air, or $CO_2$, it should be apparent to one skilled in the art that other fluids are suitable for use with the present invention, such as liquids and fluids with entrained solid particles. Further, it should be understood that within the meaning of this detailed description, the term "pressurized gas" includes gaseous compounds that may have small amounts of liquids contained therein, such as air having a humidity other than zero. Further still, although a specific pressure, duration and flow rate suitable for use with the present invention have been described for illustrative purposes, it should be apparent to one skilled in the art that these quantities are descriptive in nature. Therefore, other quantities are suitable for use with the present invention and within the scope of the invention. Preferably, the pressurized fluid is filtered to remove any unwanted contaminates.

The pressurized fluid tubing 124 terminates in a pressurized fluid nozzle 130. The pressurized fluid nozzle 130 is made from any suitable rigid material, such as stainless steel hypodermic needle tubing. In the illustrated embodiment, the nozzle is comprised of extra thin wall, 26-gauge hypodermic needle tubing having an outside diameter of 0.018 inches and an inside diameter of 0.014 inches. The pressurized fluid nozzle 130 includes a pressurized fluid discharge port or nozzle tip 112 at the distal end of the pressurized fluid nozzle 130.

In the illustrated embodiment the pressurized fluid is preferably filtered through a well known filter arrangement, one such suitable filter arrangement being a reusable syringe filter housing utilizing a fine porosity, medium-fast flow rate, 1.0 μm size particle retention, 13 mm glass fiber membrane, Model No. 66073, manufactured by Pall Gelman Laboratory, located in Ann Arbor, Mich.

The cleaning solvent delivery system 106 is comprised of cleaning solvent tubing 122 coupled to a cleaning solvent storage source (not shown). The cleaning solvent tubing 122 is coupled in fluid communication with a solvent storage source or delivery system (not shown) via flexible tubing (not shown). The cleaning solvent tubing 122 terminates in a nozzle 126 having a discharge port or nozzle tip 114 at the distal end of the nozzle 126 for delivery of the pressurized gas and cleaning solvent upon the fiber-optic endface 202. The cleaning solvent tubing 122 passes in line with the centerline of interface portion 118 through both the tubing receiving portion 118 and the interface portion 116 of the housing 110.

The cleaning solvent tubing 122 may be made from any suitable rigid material, such as stainless steel hypodermic needle tubing. In the illustrated embodiment, the nozzle is comprised of extra thin wall, 20-gauge hypodermic needle tubing having an inside diameter of 0.028 inches. The inside diameter is selected to allow the pressurized fluid tubing 124 to pass therethrough and sufficiently oversized to result in the formation of an annulus 117 between the outer surface of the pressurized fluid tubing 124 and the inner surface of the cleaning solvent tubing 122. A venturi effect caused by the passage of pressurized fluid through the pressurized fluid nozzle 130 draws cleaning solvent from the cleaning solvent storage source (not shown), through flexible tubing connecting the cleaning solvent storage source to the cleaning solvent tubing 122, and through the annulus 117 for eventual discharge from the nozzle tip 114. Further, although in the illustrated embodiment the pressurized fluid tubing 124 is depicted running concentrically within the cleaning solvent tubing 122, it should be apparent to one skilled in the art that other configurations are suitable for use with the present invention. For instance, the cleaning solvent tubing 122 may run within the pressurized fluid tubing 124. Alternately, the cleaning solvent tubing 122 and the pressurized fluid tubing 124 may be separate and distinct units directed at the endface and/or directed to discharge into the flow path of the other, as should be apparent to one skilled in the art.

It should also be apparent to one skilled in the art that any suitable cleaning solvent able to effectively remove contaminants contained on the endface of the fiber-optic strand is suitable for use in the present invention. The cleaning solvent may be a gas, liquid, solid or a combination thereof. Preferably, the cleaning solvent, if a liquid, has a flashpoint above 50 degrees Celsius. The cleaning solvent may be heated to increase the efficiency of the cleaning solvent. One suitable cleaning solvent is a hydrocarbon and terpene blend solvent, manufactured by American Polywater Corporation, located in Stillwater, Minn., sold under the trademark HP™, product number HPV-16LF. The hydrocarbon and terpene blend is comprised of a medium aliphatic petroleum solvent and a monocyclic terpene. In another embodiment, the cleaning solvent is a cyanide gas, capable of dissolving some plastics. In yet another embodiment, the cleaning solvent is a liquid with soft suspended solids therein. In still yet another embodiment, the cleaning solvent is a mixture of a fluorinated ether, a chlorinated alkalene, and an alcohol. More specifically, the cleaning solvent is a mixture comprising Methyl Nonafluorobutyl Ether, Ethyl Nonafluorobutyly Ether, Trans-1,2-dichloreoethylene, and Isopropanol, one suitable example being manufactured by 3M™ located in St. Paul, Minn., and other locations worldwide, and sold under the name NOVEC FLUID HFE-72DA.

In the illustrated embodiment, the cleaning solvent is delivered by means of a venturi effect caused by the passing of the pressurized fluid through the pressurized fluid nozzle 130. In another embodiment, the cleaning solvent is delivered by a pump. One such suitable pump is a solenoid operated diaphragm pump, manufactured by Clark, located in Hudson, Mass., Model No. DMS 035. The pump is capable of providing a fluid at 5 psi at a flow rate of 160 ml/min. Although a specific pump has been described that is suitable for use with the present invention, it should be apparent to one skilled in the art that any such suitable pump may be used with the present invention without departing from the scope of the invention.

In the illustrated embodiment, approximately 25 microliters of cleaning solvent are delivered per three second cleaning blast. Nonetheless, it should be apparent to one skilled in the art that other quantities and durations are suitable for use with the present invention, and are therefore within the scope of the invention. In the present embodiment the cleaning solvent discharge port or nozzle tip 114 is preferably located approximately 0.02 inches to approximately 0.20 inches from the endface. However, it should be apparent to one skilled in the art that other distances are appropriate for use with the present invention. It should also be apparent to one skilled in the art that the spacing of the nozzle tip 114 from the endface affects the back pressure and the effectiveness of the cleaning ability of the present invention. More specifically, if the nozzle tip 114 is placed too close to the endface, back pressures escalate, decreasing the effectiveness of the cleaning operation. On the other hand, if the nozzle tip 114 is displaced too far from the endface, the energy of the jet is dissipated prior to impacting the endface 202, thereby significantly reducing the cleaning effectiveness of the apparatus. In the illustrated embodiment, a spacing of 0.05 inches is preferred.

In the illustrated embodiment, the cleaning solvent is also preferably filtered through a well known filter arrangement, one such suitable filter arrangement being a reusable syringe filter housing utilizing a fine porosity, medium-fast flow rate, 1.0 μm size particle retention, 13 mm glass fiber membrane, Model No. 66073, manufactured by Pall Gelman Laboratory, located in Ann Arbor, Mich.

Still referring to FIGS. 1 and 2, in light of the above description of the fiber-optic endface cleaning apparatus 100, the operation of one embodiment of the fiber-optic endface cleaning apparatus 100 during a typical cleaning cycle will now be described. First, a fiber-optic connector is removed from the female input 204 and the interface portion 116 of the endface cleaning apparatus 100 is inserted therewithin. The cleaning process is then initiated by pressing a button or similar actuator (not shown). Dry, filtered air at 100 psi is applied at a rate of 112 ml/sec in 3-second bursts through the pressurized fluid tubing 124. About 0.01 ml to about 0.05 ml, with a preferred value of approximately 0.025 ml, of a cleaning solvent comprised of a liquid hydrocarbon and terpene solvent mixture, is drawn through the cleaning solvent delivery tubing 122 in approximately the first 100 milliseconds by a venturi effect created by the flow of filtered air through the pressurized fluid nozzle 130.

The pressurized air mixes with the cleaning solvent, thereby creating an aerosol mist of cleaning solvent entrained in a high-speed gas jet. The aerosol mist of cleaning solvent and pressurized gas is discharged through the discharge port 114 of the cleaning solvent nozzle 126. The discharge port 114 is located approximately 0.02 inches to approximately 0.20 inches from the endface with the preferred distance being 0.05 inches. The aerosol mist of cleaning solvent and pressurized gas impinges the endface 202, removing any contaminants located thereupon. Vacuum is applied throughout the entire procedure and for a period thereafter through the evacuation passageway 120 at a rate of approximately 118 ml/sec, thus removing any spent pressurized gas and cleaning solvent, odors, providing general housekeeping, and maintaining the inner portions of the connector 200 slightly below atmospheric pressure. A drying phase, comprising the application of pressurized gas and evacuation vacuum upon the endface, may be initiated following the cleaning evolution to aid in the removal of any residual cleaning solvent that remains within the alignment sleeve 219. Although specific quantities, such as pressures, flow rates, durations, and fluids are disclosed above, it should be apparent to one skilled in the art that other quantities and fluids are suitable for use with the present invention, and are therefore within the scope of the invention.

Figure 3:
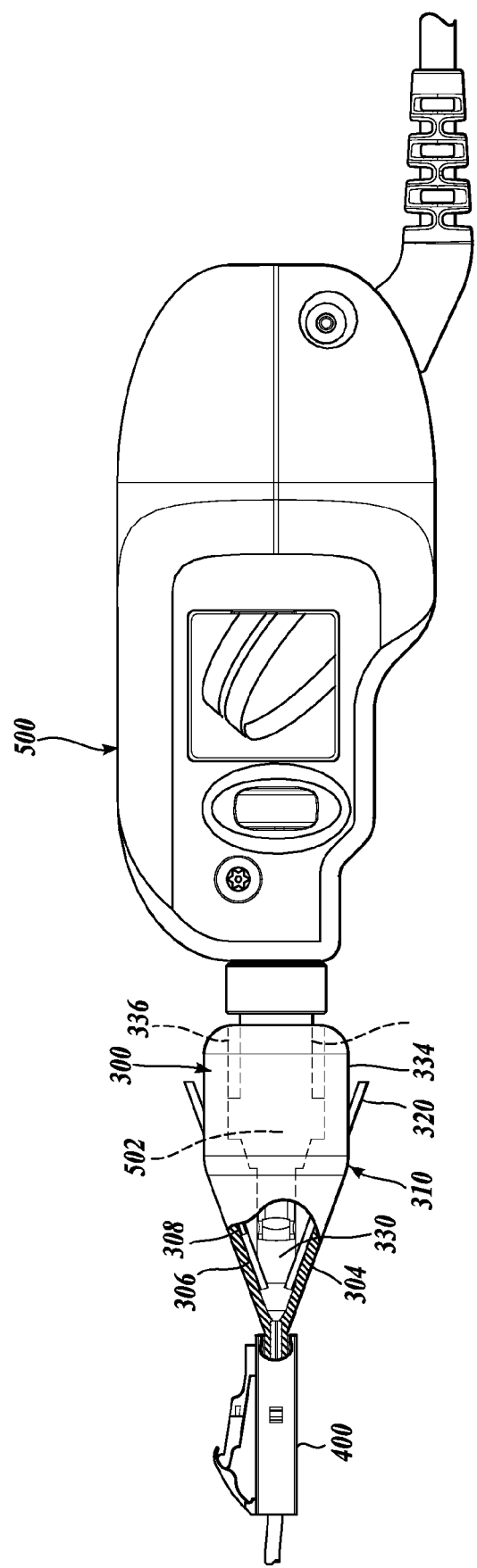
FIG. 3 is a planar elevation view of an alternate embodiment of a fiber-optic endface cleaning apparatus formed in accordance with the present invention, shown interfacing with a fiber-optic connector, wherein a microscope is received within the fiber-optic endface cleaning apparatus.
Figure 4:
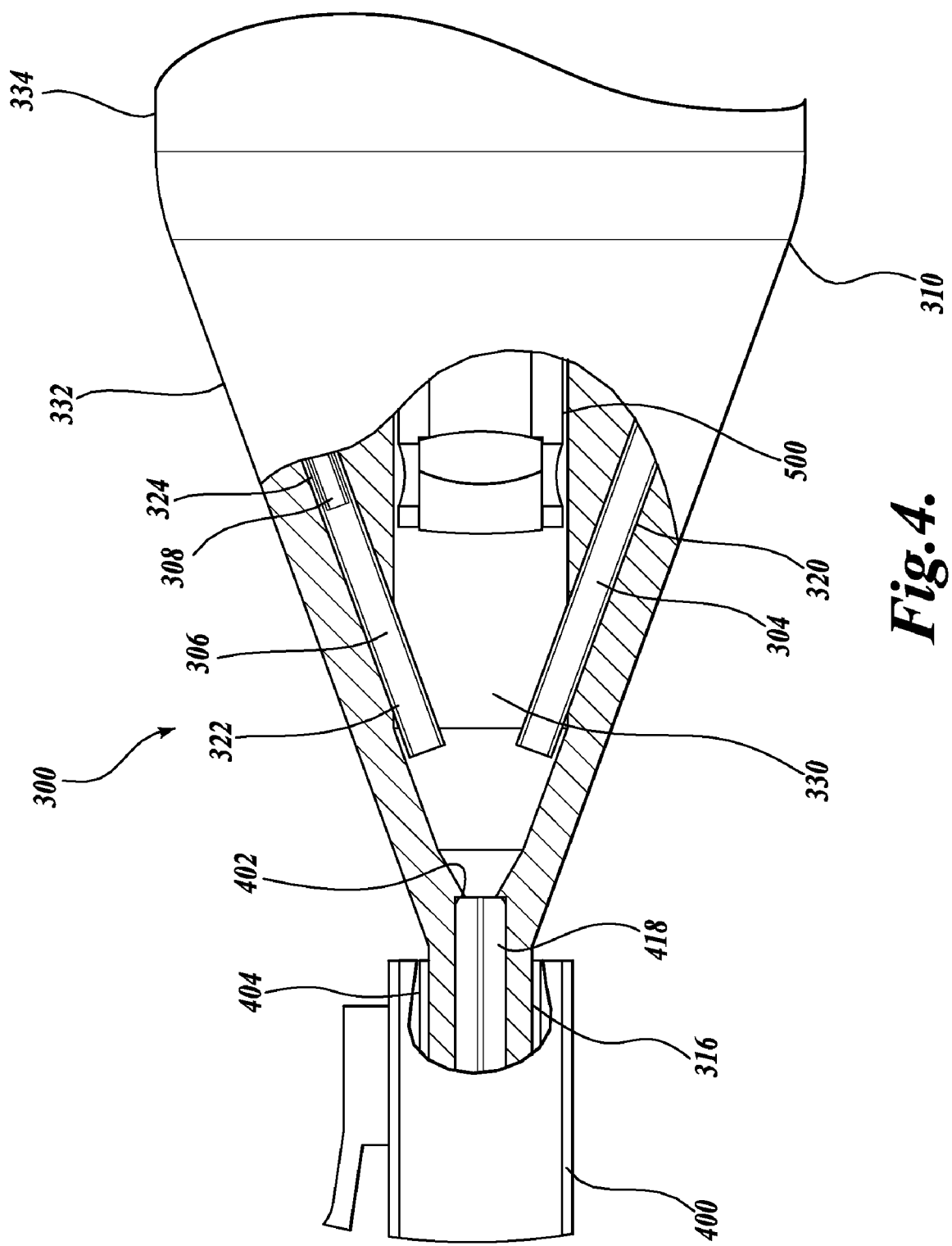
FIG. 4 is a fragmentary detail view of the head portion of the alternate embodiment of the fiber-optic endface cleaning apparatus depicted in FIG. 3.

Referring now to FIGS. 3 and 4, an alternate embodiment of a fiber-optic endface cleaning apparatus 300 formed in accordance with the present invention will now be described. The fiber-optic endface cleaning apparatus 300 is capable of interfacing with a fiber-optic connector 400, such as the fiber-optic connectors 214 and 216 shown in FIGS. 1 and 2, to clean the endfaces of the optical fiber(s) contained therewithin. The fiber-optic endface cleaning apparatus 300 of this embodiment is similar to the embodiment described above and depicted in FIGS. 1 and 2, with the exception that the fiber-optic endface cleaning apparatus 300 is designed to provide a pathway 330 through which an optical imaging axis of a microscope 500 may extend for viewing the endface 402 of the connector ferrule 418 contained within the fiber-optic connector 400, and also with the exception that the cleaning is performed once the connector 400 is removed from the bulkhead adapter. Since the optical features of the microscope 500 and the general knowledge of the optical nature of the microscope 500 are well known, these aspects of the microscope 500 will not be further discussed herein.

The fiber-optic endface cleaning apparatus 300 includes an evacuation system 304, a cleaning solvent delivery system 306, and a pressurized fluid delivery system 308, all of which are substantially similar to those described for the above embodiment. Although an active evacuation system 304 is depicted in this embodiment substantially similar to the system described for the above embodiment, it should be apparent to one skilled in the art that the method of removing debris in this configuration may be done in either an active (vacuum) or passive (vent) manner. Specifically, it should be apparent to one skilled in the art that the evacuation system 304 may alternately accomplish the removal of debris through simply passively venting any fluids discharged upon the endface through a suitably designed evacuation system, as opposed to actively applying a vacuum in proximity to the endface as was disclosed for the previous embodiments.

The housing 310 of the endface cleaning apparatus 300 is formed by joining or integrally forming a hollow cone-shaped section 332 to an axially aligned hollow cylindrically shaped section 334. The cone shaped section 332 includes an interface portion 316. The interface portion 316 is a hollow elongate block structure having inner dimensions substantially similar to the outer dimensions of the ferrule 418 of the fiber-optic connector 400 to allow the insertion of the ferrule 418 therein. It should be apparent to one skilled in the art that a similar configuration wherein the interface portion 316 is designed to interface with inner dimensions of a female input of a bulkhead adapter is a clear extension of this embodiment. The interface portion 316 is configured to orient the components of the cleaning solvent delivery system 306 and the pressurized fluid delivery system 308 contained within the cone-shaped section 332 so that any fluid discharged therefrom will properly impinge the fiber-optic endface 402, as will be discussed in further detail below. The cone-shaped section 332 allows the placement of the components of the cleaning solvent delivery system 306, pressurized fluid delivery system 308, and evacuation system 304 out of the optical pathway 330 of the microscope 500.

Joined to the cone-shaped section 332 is the cylindrically shaped section 334. The evacuation passageway 320, cleaning solvent tubing 322, and pressurized fluid tubing 324 pass through the cylindrically shaped section 334. The cylindrically shaped section 334 further includes a receiving aperture 336 for receiving a head portion 502 of the microscope 500 therewithin. When the head portion 502 of the microscope 500 engages the receiving aperture 336 during insertion within the housing 310, the receiving aperture 336 serves to align the optical imaging axis of the microscope 500 through the optical pathway 330 that passes through the housing 310 and upon the endface 402 of the fiber-optic strand, allowing the user to view the fiber-optic endface 402. In this embodiment, the microscope 500 is inserted after the completion of a cleaning cycle to inspect and view the endfaces 402 of the optical fiber to verify the effectiveness of the cleaning cycle.

Although in the illustrated embodiment, the microscope 500 is a separate unit operable to removably engage the endface cleaning apparatus 300, it should be apparent to one skilled in the art that the microscope 500 may be integrally formed or otherwise permanently affixed to the endface cleaning apparatus 300 without departing from the scope of the invention. Within this alternate embodiment, the user would be able to view the endface during the cleaning cycle or shortly thereafter without removal of the endface cleaning apparatus 300 from the fiber-optic connector 400.

The operation of the alternate embodiment of the endface cleaning apparatus 300 depicted in FIGS. 3 and 4 is substantially similar in operation to the endface cleaning apparatus embodiment described above and depicted in FIGS. 1 and 2 with exception of the use of the microscope 500 and the orientation of the evacuation system 304, the cleaning solvent delivery system 306 and the pressurized fluid delivery system 308. Inasmuch as the operation is substantially similar to that described above, it will not be further discussed herein.

Figure 5:
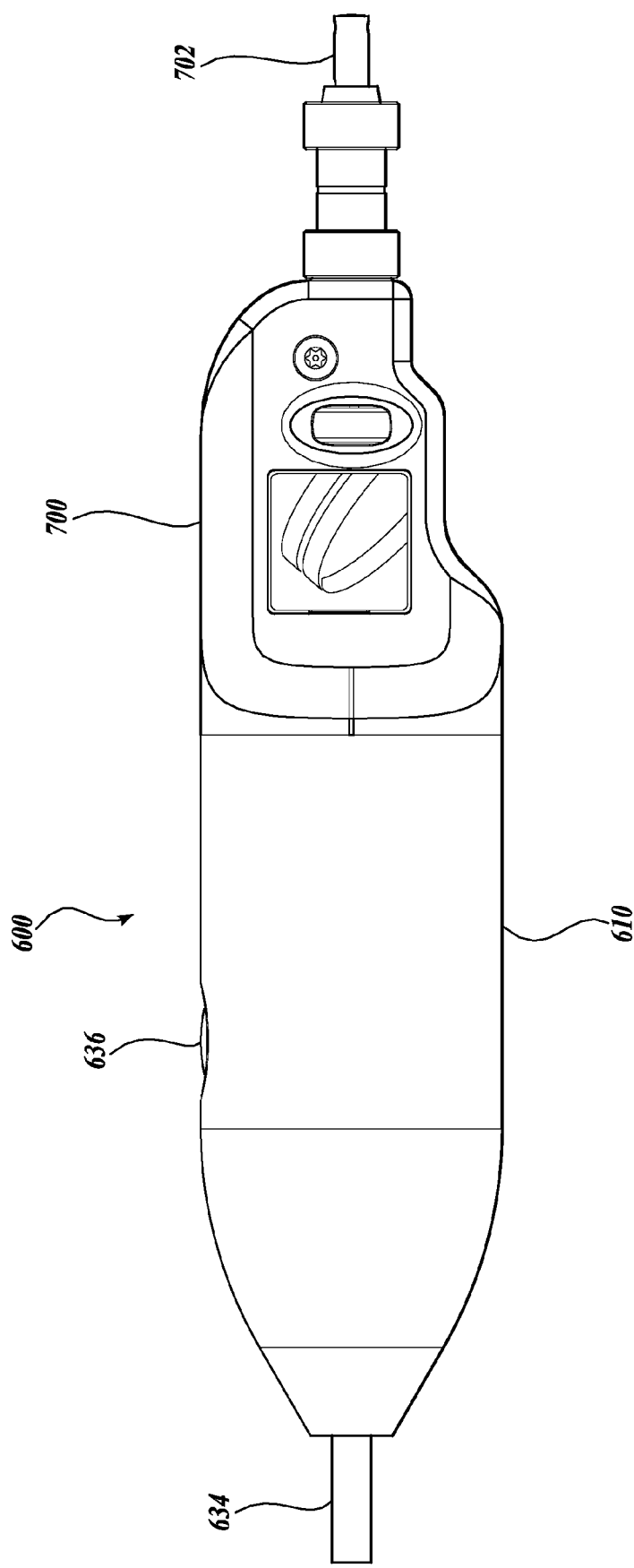
FIG. 5 is a planar elevation view of another alternate embodiment of a fiber-optic endface cleaning apparatus formed in accordance with the present invention, wherein the fiber-optic endface cleaning apparatus further includes a microscope for inspecting fiber-optic endfaces.

Referring now to FIG. 5, a second alternate embodiment of a fiber-optic endface cleaning apparatus 600 formed in accordance with the present invention will now be described. The fiber-optic endface cleaning apparatus 600 is capable of interfacing with an interface device, such as those typically used in fiber-optic data transmission equipment and depicted in FIGS. 1 and 2, to clean the endfaces of the optical fibers contained therewithin. The fiber-optic endface cleaning apparatus 600 of this invention is similar to the embodiment described above and depicted in FIGS. 1 and 2, with the exception that the fiber-optic endface cleaning apparatus 600 further includes a microscope 700 integrally formed with the fiber-optic endface cleaning apparatus 600 to allow the optical imaging of the fiber-optic endfaces of the fiber-optic strands contained within a connector. Since the optical features of a microscope 700 and the general knowledge of the optical nature of a microscope are well known, these aspects of the fiber-optic endface cleaning apparatus 600 will not be further discussed herein.

The microscope 700 is located on a first end of a housing 610 of the fiber-optic endface cleaning apparatus 600, opposite a cleaning apparatus interface portion 634 located on a second end. The cleaning apparatus interface portion 634 includes an evacuation system, a cleaning solvent delivery system, and a pressurized fluid delivery system, all of which are substantially similar to those described for the above two embodiments and therefore will not discuss further herein.

In operation, a user selectively inserts either the first or second end within an interface device depending on whether cleaning or inspecting operations are desired. For example, if the user desires to clean a fiber-optic endface contained within the bulkhead adapter, the cleaning apparatus interface portion 634 is inserted within the bulkhead adapter, and an actuator button 636 is depressed to initiate cleaning operations. Upon completion of the cleaning operations, the user would subsequently remove the fiber-optic endface cleaning apparatus 600 and rotate the endface cleaning apparatus 600 end-to-end, followed by the insertion of an interface portion 702 of the microscope 700 within the bulkhead adapter. The interface portion 702 is designed to interface with a bulkhead adapter such that the optical lens of the microscope may focus upon the fiber-optic endfaces contained within the fiber-optic bulkhead adapter.

Referring now to FIGS. 6-12, an alternate embodiment of a fiber-optic endface cleaning apparatus 800 formed in accordance with the present invention will now be described. The fiber-optic endface cleaning apparatus 800 is capable of interfacing with an interface device, such as a fiber-optic bulkhead adapter 900, to clean the endfaces of the optical fibers contained therewithin. The fiber-optic endface cleaning apparatus 800 of this embodiment is similar in operation and structure to the embodiment described above and depicted in FIGS. 1-2, with the exception that the fiber-optic endface cleaning apparatus 800 further includes a retractable baffle 802.

Figure 11:
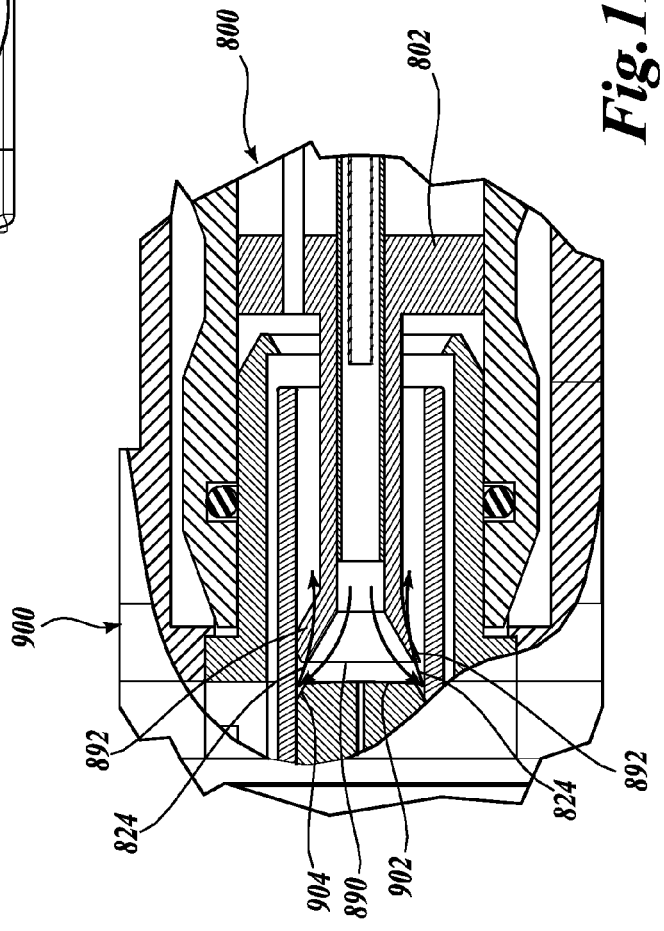
FIG. 11 is a fragmentary cross-sectional view of the alternate embodiment of FIG. 10, showing a magnified perspective of the baffle in an extended position.
Figure 12:
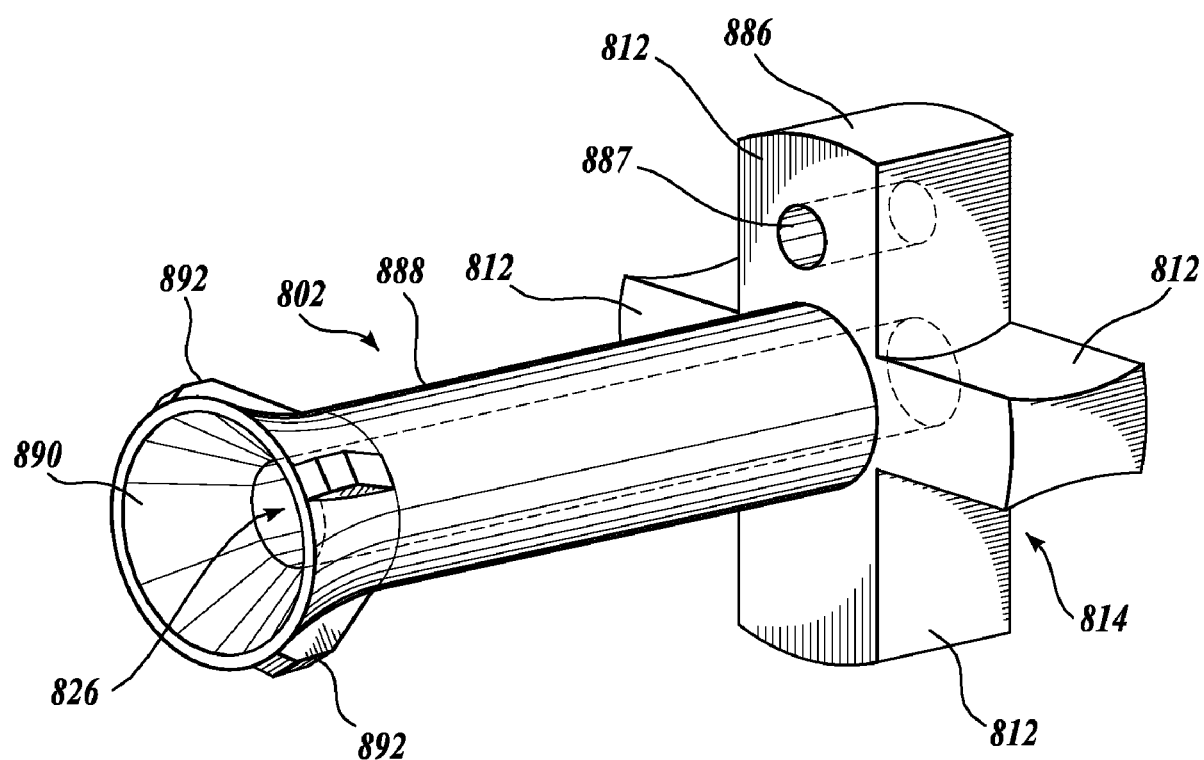
FIG. 12 is a perspective view of the baffle depicted in FIG. 8.

Referring to FIGS. 11 and 12, the baffle 802 aids in the removal of cleaning solvent remaining within an alignment sleeve 822 during a cleaning evolution. Moreover, the fiber-optic endface 902 has a chamfer 904 located around the periphery of the fiber-optic endface 902. It has been found that during cleaning operations, cleaning solvent and/or other fluids may collect in the chamfer 904. The chamfer 904 acts as a protected cavity, partially shielding the cleaning solvent contained therewithin from the pressurized fluid and/or applied vacuum. Thus, while the pressurized fluid is flowing, the fiber-optic endface 902 remains in a clean and dry state. However, when the flow of the pressurized fluid ceases, the cleaning solvent present in the chamfer 904 and any contaminants contained therein flow back onto the fiber-optic endface 902, recontaminating the endface. The retractable baffle 802 of the illustrated embodiment aids in the removal of cleaning solvent from the chamfer by concentrating the flow of the pressurized fluid into the chamfer 904. Thus, when the baffle 802 is in an extended position as shown in FIG. 11, the pressurized fluid more directly impinges the cleaning solvents contained in the chamfer 904, thereby enhancing cleaning solvent removal.

Focusing now more on the outer structure of the fiber-optic endface cleaning apparatus 800, and in reference to FIGS. 6-8, the external components comprising the fiber-optic endface cleaning apparatus 800 will be described. The fiber-optic endface cleaning apparatus 800 includes a housing 810 subdivided into three distinct sections: an interface section 844, a middle section 846, and a baffle actuator section 848. The interface section 844 and the baffle actuator section 848 are joined to the middle section 846 by well known fasteners 840 and 842. Coupled to the interface section 844 is an interface tip 816. The interface tip 816 is a hollow, sometimes cylindrical-shaped structure having outer dimensions substantially similar to the inner dimensions of an entry female input 906 of a fiber-optic bulkhead adapter 900 (see FIG. 9) to allow the insertion of the interface tip 816 therein.

The interface tip 816 is configured to orient the components of the cleaning solvent delivery system and the pressurized fluid delivery system contained within the fiber-optic endface cleaning apparatus 800 so that any fluid discharged therefrom will properly impinge the fiber-optic endfaces, as will be discussed in further detail below. Further, the interface tip 816 or some portion of the interface portion 844 is preferably configured to allow the interface tip 816 or at least a portion of the interface portion 844 to be removed from the endface cleaning apparatus 800. Configured as such, the interface tip 816 or some portion of the interface portion 844 may be easily removed and exchanged for a different style of interface tip 816 or interface portion 844 to accommodate a wide variety of interface devices.

Figure 6:
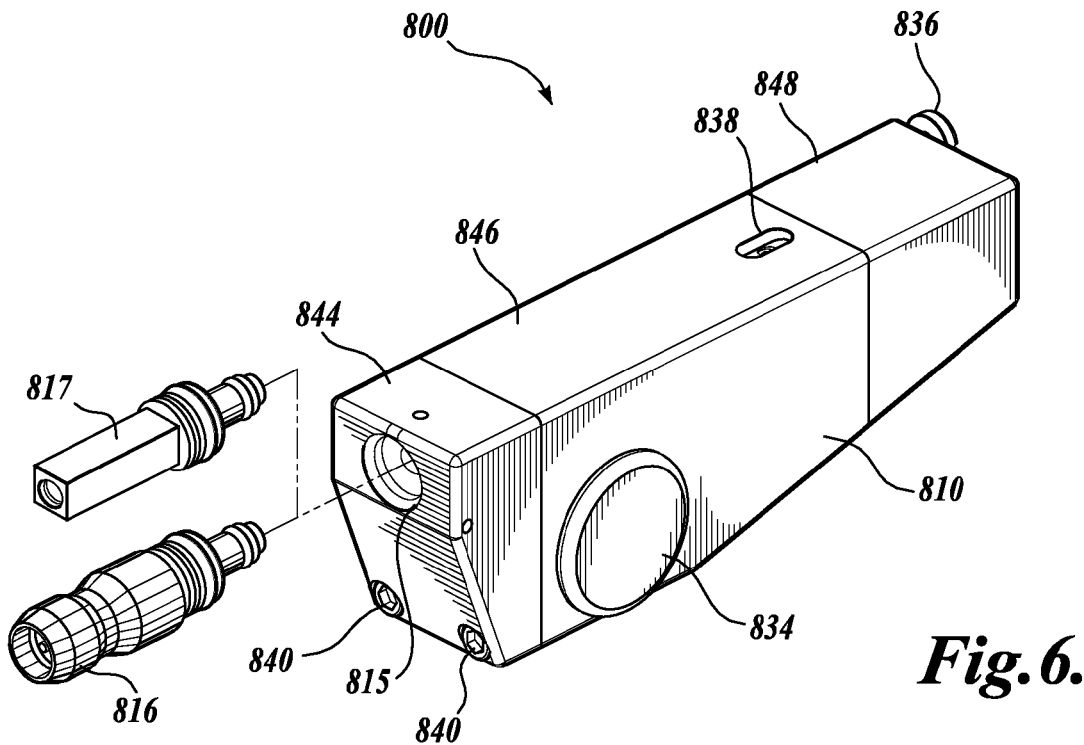
FIG. 6 is an exploded perspective view of yet another alternate embodiment of a fiber-optic endface cleaning apparatus formed in accordance with the present invention, showing an interface section having one of two interchangeable interface tips selectively attachable thereto.
Figure 7:
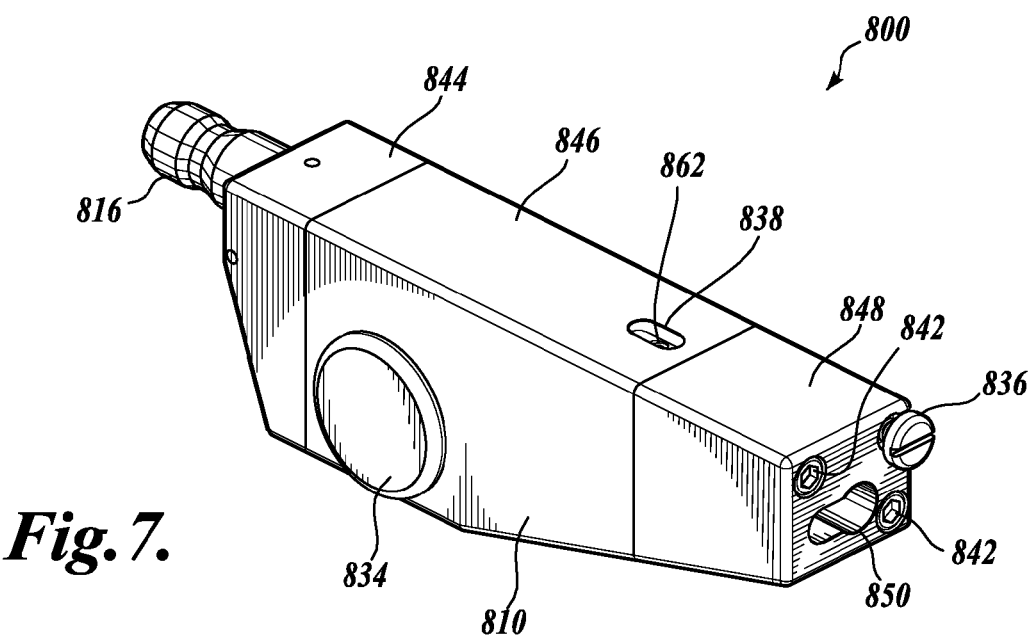
FIG. 7 is a perspective view of the alternate embodiment of the fiber-optic endface cleaning apparatus depicted in FIG. 6, showing a baffle actuator section having a needle valve adjustment screw protruding therefrom.

In the embodiment depicted in FIG. 6, interface tip 816 may be selectively removed from an interface tip receiving port 815 in the interface portion 844 and replaced with an alternately shaped interface tip 817, thereby allowing the endface cleaning apparatus 800 to interface with a fiber-optic endface associated with a different shaped interface device. Thus, fiber-optic endface cleaning apparatus 800 may be selectively configured to be compatible with nearly any interface device. As should be apparent to one skilled in the art, although an interchangeable interface tip 816 or interface portion 844 is described with specificity in regard to the above described embodiment only, it should be apparent to one skilled in the art that any of the embodiments described within this detailed description may incorporate this concept therein.

Disposed on the middle section 846 is an actuator button 834 and an access port 838. By pressing the actuator button 834, a user initiates the cleaning process. The access port 838, an oblong aperture in the housing 810, permits access to a set screw 862 disposed within the fiber-optic endface cleaning apparatus 800, the purpose of which will be described in further detail below. Further, the access port 838 allows the position of a baffle 802 to be visually confirmed. Further still, the access port 838 allows the manual activation of the baffle between an extended position and a retracted position.

The baffle actuator section 848, as the name implies, houses a baffle actuator 870 for selectively positioning a baffle between extended and retracted positions, as will be described in further detail below. A needle valve adjustment screw 836 for fine tuning the operation of the baffle actuator 870 is disposed on the outer surface of the baffle actuator section 848. Also disposed on the outer surface of the baffle actuator section 848 is an access port 850. The access port 850 allows the passage of an electrical wiring umbilical cord (not shown for clarity) for delivery of electrical control signals and power to select internal components of the fiber-optic endface cleaning apparatus 800, such as the baffle actuator 870. Further, the access port 850 allows the passage of a section of pressurized fluid delivery tubing and a section of cleaning solvent delivery tubing (not shown for clarity), substantially similar in operation and structure as the solvent tubing 122 and the pressurized fluid tubing 124 shown in FIG. 1, into the fiber-optic endface cleaning apparatus 800.

Focusing now more on the internal structure of the fiber-optic endface cleaning apparatus 800, and in reference to FIGS. 8 and 9, the internal components comprising the fiber-optic endface cleaning apparatus 800 will be described. The middle section 846 is comprised of a baffle return spring chamber 854 and a solvent delivery valve chamber 860. The baffle return spring chamber 854 is cylindrical in shape and runs longitudinally through the fiber-optic endface cleaning apparatus 800. The baffle return spring chamber 854 houses a baffle return spring 852. The baffle return spring 852 biases the baffle 802 in a retracted position, as shown in FIG. 8. The baffle return spring 852 biases the baffle 802 by exerting a spring force upon a rod clamp 864. The rod clamp 864 is reciprocatingly disposed within the baffle return spring chamber 854 and has a spring seat 866 that engages a distal end of the baffle return spring 852 and an actuator seat 868 that communicates with a baffle actuator 870. The rod clamp 864 is coupled to an actuating rod 872 through the use of a well known set screw 862.

Located adjacent to and in a parallel orientation with the baffle return spring chamber 854 is a solvent delivery valve chamber 860. The solvent delivery valve chamber 860 houses a solvent delivery valve return spring 858 and a solvent delivery valve 856. The solvent delivery valve return spring 858 biases the solvent delivery valve 856 in a closed position until actuated by fluid pressure from solvent port 898 into an open position, thereby allowing delivery of a cleaning solvent to the fiber-optic endface 902. Thus, the solvent delivery valve acts as a check valve. As should be apparent to one skilled in the art, the valve configuration herein described may be replaced by any number of actuator/valve combinations well known in the art, such as electromechanical, pneumatic, hydraulic, and mechanical actuators.

Figure 10:
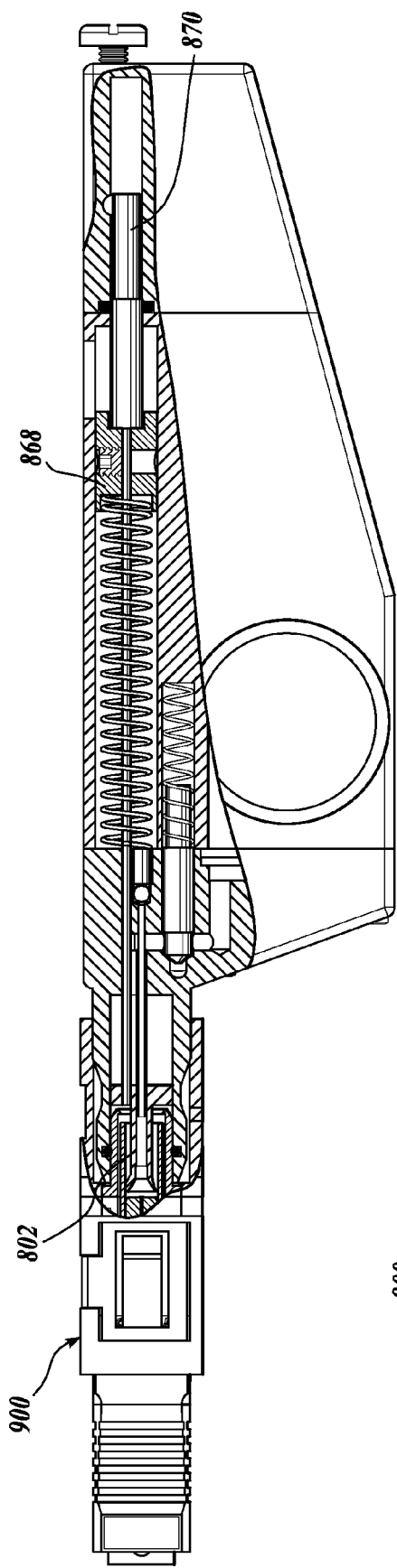
FIG. 10 is a side view of the alternate embodiment of the fiber-optic endface cleaning apparatus depicted in FIG. 6 coupled to a fiber-optic bulkhead adapter, with a portion of the fiber-optic endface cleaning apparatus and fiber-optic connector shown in cross-section, revealing a baffle in an extended position.

Focusing now on the baffle actuator section 848, the baffle actuator section 848 includes an actuator chamber 876. The actuator chamber 876 runs longitudinally through the baffle actuator section 848 and is sized to house the baffle actuator 870. As should be apparent to one skilled in the art, the baffle actuator 870 may be selected from any number of well known actuators in the art such as electromechanical, pneumatic, hydraulic, or mechanical actuators. The baffle actuator 870 may be selectively toggled between an extended position, as shown in FIG. 10, and a retracted position, as shown in FIG. 8. An O-ring 878 is disposed at the distal end of the actuator chamber 876 at the interface between the middle section 846 and the baffle actuator section 848. The O-ring 878 provides a pressure resistant seal to isolate the air volume within the actuator chamber 876. Also disposed on the baffle actuator section 848 is the needle valve adjustment screw 836. The needle valve adjustment screw 836 is manipulated during manufacture to selectively adjust the operating parameters of the baffle actuator 870, such as the actuation rate of the baffle 802.

Focusing now on the interface section 844, the interface section 844 is comprised of a fiber-optic endface receiving chamber 880 sized to receive a protective housing 926 that partially encompasses the fiber-optic endface 902 and alignment sleeve 822. Disposed in an annular channel formed on the inner wall of the fiber-optic endface receiving chamber 880 is a well known O-ring 884. The O-ring 884 acts as a seal between the protective housing 926 of the alignment sleeve 822 and the fiber-optic endface receiving chamber 880, thereby impeding the passage of fluids between the protective housing 926 and the inner surface of the fiber-optic endface receiving chamber 880. It should be apparent to one skilled in the art that this seal may alternately be formed by any number of methods well known in the art, or alternately, may be omitted if ambient contamination is not a consideration.

Referring now to FIGS. 8, 9, and 12, disposed within the fiber-optic endface receiving chamber 880 is the baffle 802. The baffle 802 is comprised of a base portion 886 integrally formed to a concentrically oriented hollow cylinder 888. The base portion 886 is formed from four legs 812 disposed radially outward from the cylinder 888 so that each leg 812 is spaced 90° from the closest adjacent legs 812. Thus, relief gaps 814 are formed between adjacent legs 812 for permitting the passage of evacuation gases thereby. The base portion 886 of the baffle 902 is adapted to receive an actuating rod 872 therein. Upon actuation of the actuating rod 872 by the baffle actuator 870, the baffle 802 is reciprocally driven within the fiber-optic endface receiving chamber 880 through the pressure exerted by the actuating rod 872 upon the baffle 802 via the base portion 886.

The cylinder 888 has a flared distal end 890, having guiding members, such as five longitudinally aligned guiding ribs 892 equally spaced around the flared distal end 890. The guiding ribs 892 aid in the alignment of the baffle 802 within the alignment sleeve 822, which partially encloses the endface 902, while still allowing the flow of fluids for removal from the connector 900 between adjacent guiding ribs 892. Although the illustrated embodiment is shown with five guiding ribs 892, it should be apparent to one skilled in the art that other quantities of guiding ribs 892 are suitable for use with the present invention, such as three, four, or six for example.

Passing through a hollow cylindrical passage 826 in the baffle 802 is a pressurized fluid nozzle 896 and a cleaning solvent nozzle 894. The pressurized fluid nozzle 896 and the cleaning solvent nozzle 894 are substantially similar in construction and operation as that of the pressurized fluid nozzle 130 and cleaning solvent nozzle 126 depicted in the FIG. 2, and therefore will not be discussed in further detail here.

In fluid communication with the cleaning solvent nozzle 894 is a cleaning solvent passageway 899. The cleaning solvent passageway 899 is in fluid communication with the solvent delivery valve 856, a solvent port vent 832, and also with solvent delivery tubing, not shown but similar to the solvent delivery tubing 122 shown in FIG. 1. The solvent port vent 832 is open to the atmosphere to allow atmospheric air into the endface cleaning apparatus 800 during solvent flow. Moreover, the solvent port vent 832 aids in solvent flow by impeding vapor lock formation by the introduction of near atmospheric pressure air into the solvent flow. Air entering the solvent port vent 832 during solvent flow is filtered via a filter 830. In the illustrated embodiment, the filter 830 is a 1 micron rated glass fiber filter, although it should be apparent to one skilled in the art that other filters are suitable for use in the present invention, and further, that the filter may be eliminated if ambient contamination is not a consideration.

The solvent delivery valve 856 is situated in the cleaning solvent passageway 899, between the solvent port vent 832 and the cleaning solvent nozzle 894. The solvent delivery valve 856 selectively controls the passage of a solvent to the cleaning solvent nozzle 894. Moreover, the solvent delivery valve 856 is actuated between a flow and no flow condition by fluid pressure applied to solvent port 898 during cleaning.

The operation of the alternate embodiment of the endface cleaning apparatus 800 depicted in FIGS. 6-11 is substantially similar in operation to the endface cleaning apparatus embodiment described above and depicted in FIGS. 1 and 2 with exception of the use of the baffle 802. Inasmuch as the operation is substantially similar to that described above, the aspects of operation substantially similar to that described above will not be further discussed herein. As for the baffle 802, the baffle is actuatable between the retracted position shown in FIG. 8 and extended position shown in FIG. 9. By selectively positioning the baffle 802 as such, the amount of residual cleaning solvent remaining in the connector 900 after a cleaning evolution is substantially reduced.

More specifically and as best seen in FIG. 11, the fiber-optic endface 902 has a chamfer 904 located around the periphery of the fiber-optic endface 902 as discussed above. The retractable baffle 802 of the illustrated embodiment aids in concentrating the flow of the pressurized fluid into the chamfer 904. Thus, with the baffle in the extended position, the pressurized fluid is directed in a flow path 824 which more directly impinges the cleaning solvents contained in the chamfer 904, thereby enhancing cleaning solvent removal during a drying/solvent removal phase of the cleaning evolution, when the pressurized fluid, absent cleaning solvent, is directed at the endface 902.

Inasmuch as the baffle 802 may impede the flow of cleaning solvent and pressurized fluid during cleaning operations, the baffle 802 may be selectively retracted during the application of the cleaning solvent and pressurized fluid so as to allow the unfettered flow of these fluids during cleaning as shown in FIG. 9. Although a retractable baffle is shown, it should be apparent to one skilled in the art that the baffle may be rigidly held in an extended position. Further still, although the illustrated embodiment depicts a baffle of a certain shape and construction, it should be apparent to one skilled in the art that the baffle may take many various forms. For instance, the baffle may be formed by flaring the end of the cleaning solvent nozzle 894 outwards. Therefore it should be apparent to one skilled in the art that the baffle is defined by its ability to enhance the flow of fluids within the chamfer 904 and across the endface 902, and is therefore not limited to the illustrated form shown in FIGS. 8-12.

While the baffle previously described is effective at reducing the volume of solvent retained by the chamfer 904, an alternate treatment of the problem of re-contamination of the fiber endface 902 by flow of the solvent back onto the cleaned surface is to increase the surface tension of the retained fluid. The surface tension may be increased by adding a chemical agent, such as water, during a second fluid application stage, which would tend to minimize the tendency of the retained fluid to wick across the cleaned surface recontaminating the surface. As should be apparent to one skilled in the art, the chemical agent may be delivered upon the endface by any suitable means. For example, the chemical agent may be applied in the same manner as the solvent by simply toggling the solvent delivery tubing between fluid communication with a solvent source and fluid communication with a chemical agent source, as should be apparent to one skilled in the art. Alternately, a third nozzle may be disposed in the housing for discharging the chemical agent directly upon the endface, or for dispensing the chemical agent into the pressurized fluid flow for delivery upon the endface.

Figure 13:
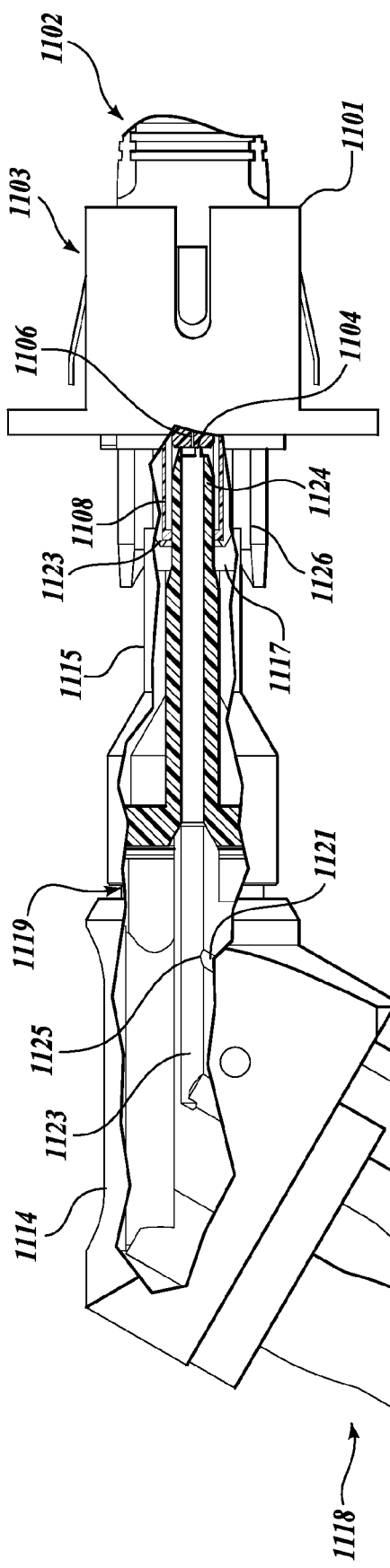
FIG. 13 is an elevation view of an alternate embodiment of a fiber-optic endface cleaning apparatus formed in accordance with the present invention, the endface cleaning apparatus shown engaged with an interface device. A portion of a housing of the endface cleaning apparatus has been removed to show a fluid dispensing assembly housed therein, with a portion of the fluid dispensing assembly and an alignment sleeve shown in cross-section.
Figure 14:
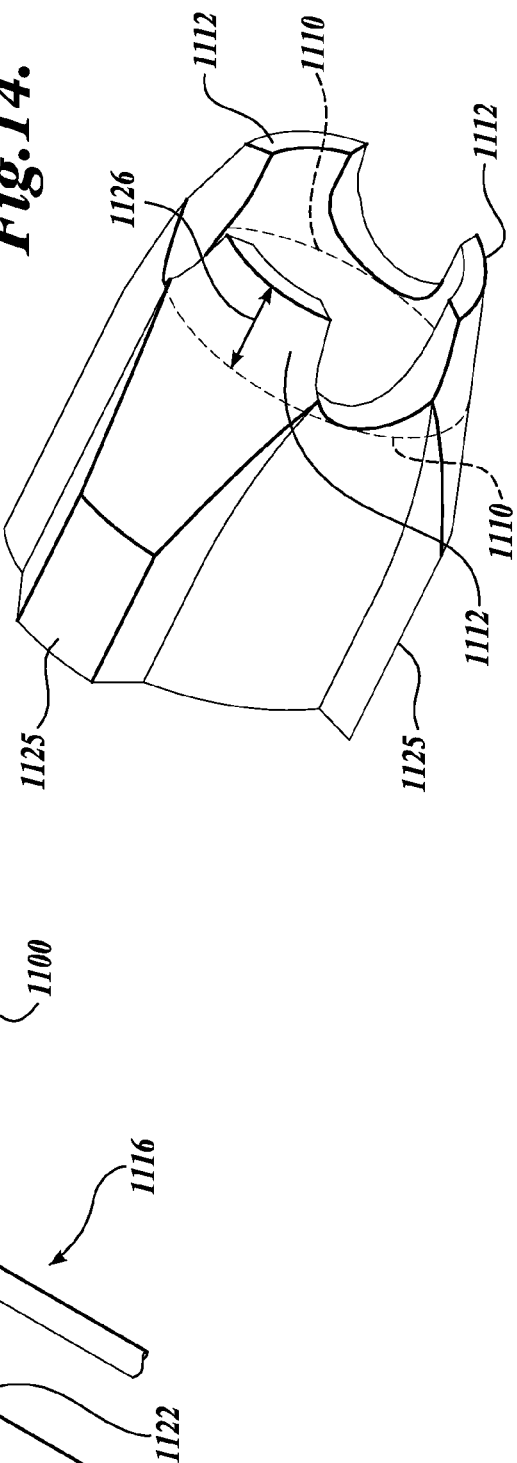
FIG. 14 is a perspective view of a distal end of the fluid dispensing assembly shown in FIG. 13.

Referring now to FIGS. 13 and 14, an alternate embodiment of a fiber-optic endface cleaning apparatus 1100 formed in accordance with the present invention will now be described. The fiber-optic endface cleaning apparatus 1100 is capable of interfacing with an interface device 1103 to clean an endface 1104 of an optical fiber 1106 at least partially disposed therewithin. The fiber-optic endface cleaning apparatus 1100 of this embodiment is similar in operation and structure to the embodiments described above, and most specifically the embodiment depicted in FIGS. 1 and 2. However, the endface cleaning apparatus 1100 of FIGS. 13 and 14 differs most notably from the above described embodiments in that the endface cleaning apparatus 1100 engages the endface 1104 during cleaning operations. More specifically, a nozzle 1110 of the endface cleaning apparatus 1100 has a plurality of fingers or extensions 1112 extending outward from the nozzle 1110 to engage and thereby maintain a selected separation distance between the endface 1104 and the nozzle 1110 during cleaning operations. The method of combining fluid and solvent also differs, i.e. the solvent is injected under pressure into the fluid stream rather than being "drawn" into the stream by a venturi effect.

The endface cleaning apparatus 1100 includes a housing 1114, a fluid dispensing assembly 1116, and an evacuation assembly 1118. The housing 1114 is made of any rigid or semi-rigid material, such as plastic, metal, etc. The housing 1114 provides an enclosure to partially house portions of the fluid dispensing and evacuation assemblies 1116 and 1118. The housing 1114 is preferably configured to be easily gripped by a hand of a user.

The housing 1114 also includes a front section 1115. The front section 1115 includes the components of the endface cleaning apparatus 1100 extending outward toward the endface from a joint indicated by reference numeral 1119. Preferably, the front section 1115 of the housing may be selectively removed from the housing 1114, for example by unthreading the front section 1115 from the remaining portion of the housing at the threaded joint 1119. Once removed, the front section 1115 may be replaced with an alternately shaped front section, such as the one depicted and described in relation to FIG. 20, thereby allowing the endface cleaning apparatus 1100 to interface with a fiber-optic endface associated with a differently shaped interface device. Thus, the fiber-optic endface cleaning apparatus 1100 may be selectively configured to be compatible with nearly any interface device.

The fluid dispensing assembly 1116 includes a solvent delivery system 1120 and a pressurized fluid delivery system 1122 similar in construction and operation to the cleaning solvent delivery system 106 and the pressurized fluid delivery system 108 depicted and described in relation to FIGS. 1 and 2. The solvent delivery system 1120 includes a solvent pipe 1121 for conveying a solvent therein. The pressurized fluid delivery system 1122 also includes a pipe 1123, the pipe 1123 suitable for conveying a pressurized fluid therein. The solvent pipe 1121 discharges into pipe 1123 through port 1125. Thus, downstream of port 1125, the pipe of the pressurized fluid delivery system 1122 conveys a fluid and solvent mixture, preferably wherein the solvent is atomized and mixed among a gaseous pressurized fluid.

The remaining aspects of the solvent and pressurized fluid delivery systems 1120 and 1122 are similar to aspects of previously described cleaning solvent delivery systems and pressurized fluid delivery systems. Therefore, for the sake of brevity, this description will not repeat herein aspects of the endface cleaning apparatus 1100 which are substantially similar to solvent and fluid delivery systems described above, such as the solvent and fluid delivery systems 106 and 108 of the endface cleaning apparatus 100 described and depicted in relation to FIG. 1.

The fluid dispensing assembly 1116 includes an interface portion 1124. In the illustrated embodiment, the interface portion 1124 is sized and configured to be cooperatively received within the interface device 1103 to align the interface device 1124 within the interface device 1103. More specifically, the interface portion 1124 is sized and configured to be received by the interface device 1103 such that the cleaning fluids and solvents discharged from the fluid dispensing assembly 1116 are directed at the endface 1104 when the interface portion 1124 is received by the interface device 1103.

In the case of the illustrated embodiment, the interface portion 1124 is sized and configured to have outer dimensions that correspond to the inner dimension of an alignment sleeve 1108 of the interface device 1103. Thereby, when the interface portion 1124 is cooperatively received by the alignment sleeve 1108, the components of the fluid dispensing assembly 1116 are positioned so that any fluid discharged therefrom will impinge the fiber-optic endface 1104.

More specifically, the interface portion 1124 may include a plurality of guiding members, such as three longitudinally aligned guiding ribs 1125 equally spaced around the outer circumference of the interface portion 1124. The guiding ribs 1125 aid in the alignment of the interface portion 1124 within the alignment sleeve 1108, while still allowing the flow of fluids outward between adjacent guiding ribs 1125 for removal escape from the interface device 1103.

The interface portion 1124 of the fluid dispensing assembly 1116 includes a nozzle tip 1110, wherein at least a majority of the pressurized fluid and solvent are released from the fluid dispensing assembly 1116. The interface portion 1124 also includes one or more fingers or extensions 1112 (three shown) which extend outward and parallel with the longitudinal axis of the interface portion 1124. The distal ends of the extensions 1112 are adapted to engage the endface 1104 of the optical fiber 1106. The extensions have a selected length 1126, wherein when the extensions 1112 engage the endface 1104, the nozzle tip 1110 is separated from the endface by the selected length 1126. Preferably, the selected length is between about 0.015 and about 0.25 inches.

In the illustrated embodiment, the endface 1104 is biased toward the fiber-optic endface cleaning apparatus 1100 such that when the extensions 1112 engage the endface 1104, the endface 1104 may be displaced in the direction opposite of the endface cleaning apparatus 1100 (i.e., to the right with reference to FIG. 13). Thus, with the endface biased as described, the separation distance between the endface 1104 and the nozzle tip 1110 is maintained, despite some variability between the separation distance of the interface device 1103 and the endface cleaning apparatus 1100. The user maintains a selected engagement force between the interface portion 1124 of the fluid dispensing assembly 1116 and the fiber-optic endface 1104.

Figure 15:
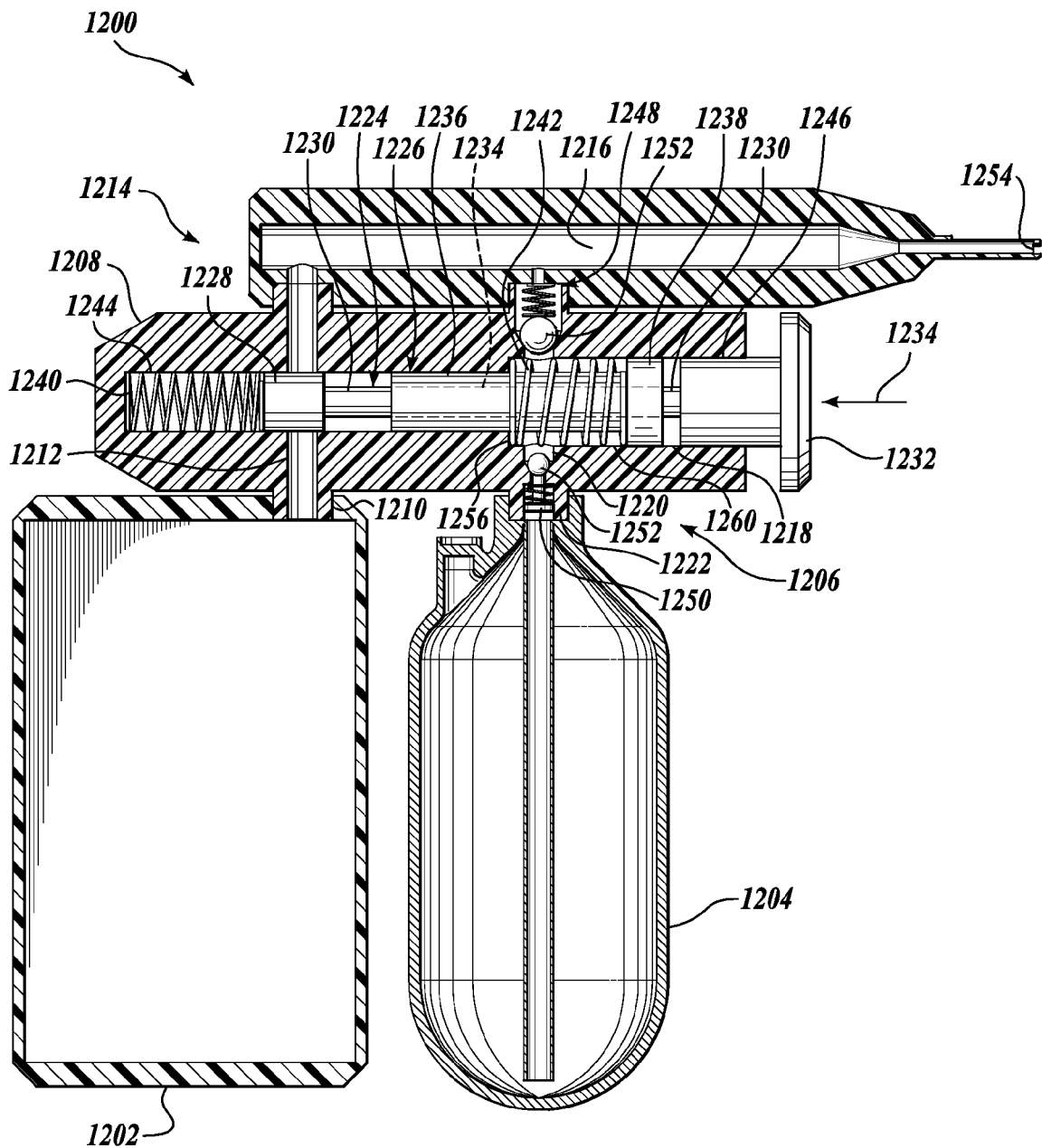
FIG. 15 is a cross-sectional view of an alternate embodiment of a fiber-optic endface cleaning apparatus formed in accordance with the present invention, the cross-sectional cut taken along a centerline of the endface cleaning apparatus.

Referring now to FIG. 15, an alternate embodiment of a fiber-optic endface cleaning apparatus 1200 formed in accordance with the present invention will now be described. The fiber-optic endface cleaning apparatus 1200 is capable of interfacing with an interface device, such as the interface device 1103 depicted in FIG. 13, to clean an endface of an optical fiber contained therewithin. The fiber-optic endface cleaning apparatus 1200 of this embodiment is similar in operation and structure to the embodiments described above, and most specifically to the embodiment depicted in FIGS. 13 and 14, with a few exceptions. For instance, the endface cleaning apparatus 1200 is adapted to couple to a first container 1202 containing a pressurized fluid and a second container 1204 containing a solvent. Further, the cleaning assembly contains a control system 1206 for controlling the dispensing of the fluid and solvent upon the endface.

The endface cleaning apparatus 1200 includes a housing 1208. The housing includes a first passageway 1212 coupling the contents of the pressurized fluid container 1202 in fluid communication with a mixing chamber 1216. The housing 1208 also includes a second passageway 1220 coupling the contents of the solvent container 1204 in fluid communication with the mixing chamber 1216. The housing further includes a control system bore 1218, which houses the majority of the components of the control system 1206.

The housing 1208 also includes a first attachment device 1210, the first attachment device 1210 adapted to permit the removable coupling of the pressurized fluid container 1202 by any well known means, such as by a threaded connection, press fitting, etc. The housing 1208 also includes a second attachment device 1222 adapted to permit the removable coupling of the solvent container 1204 by any well known means, such as by a threaded connection, press fitting, etc.

The control system 1206 selectively controls the duration, sequence, timing and quantities of pressurized fluid and solvent directed upon an endface of an optical fiber. The control system 1206 selectively controls the delivery of the pressurized fluid and solvent by selectively blocking and unblocking the first and second passageways 1212 and 1220.

The control system 1206 includes a pressurized fluid dispensing mechanism 1224, and a solvent metering mechanism 1226. The fluid dispensing mechanism 1224 includes a piston 1228 concentrically coupled to a first end of a center shaft 1230. An actuation mechanism 1232, which in the illustrated embodiment is a button, is coupled to a second end of the center shaft 1230. The solvent metering mechanism 1226 includes a cylindrical passage 1234 along the centerline of a cylindrically shaped main body 1236, the cylindrical passageway 1234 sized and configured to reciprocatingly receive the center shaft 1230 of the fluid dispensing mechanism 1224. Thus, the solvent metering mechanism 1226 is free to slide longitudinally along the length of the center shaft 1230. The solvent metering mechanism 1226 further includes a piston 1238 disposed on one end of the main body 1236 of the solvent metering mechanism 1226.

A first biasing device 1240, one suitable example being a spring, biases the fluid dispensing mechanism 1224 in a direction opposite of that depicted by the arrow indicated by reference numeral 1234 to the at rest position indicated in FIG. 15. A second biasing device 1242, one suitable example being a spring, biases the solvent metering mechanism 1226 in the direction opposite of that depicted by the arrow indicated by reference numeral 1234 to the at rest position indicated in FIG. 15.

The control system bore 1218 may be subdivided for purposes of this discussion into two sections. The first section 1244 is of a reduced diameter chosen to match closely the outer diameter of the piston 1228 of the fluid dispensing mechanism 1224 and the main body 1236 of the solvent metering mechanism 1226. The second section 1246 is of an increased diameter chosen to match closely the outer diameter of the piston 1238 of the solvent metering mechanism 1226. The differences in diameter between the first and second sections 1244 and 1246 causes a step 1256 to be formed at the interface between the first and second sections 1244 and 1246.

Focusing on the second passageway 1220, the second passageway includes a first check valve 1248 and a second check valve 1250. Both check valves 1248 and 1250 comprise balls 1252 biased in a closed position against a valve seat by a biasing device, such as a spring, to normally impede solvent from traveling from the solvent container 1204 to the second section 1246 and from the second section 1246 to the mixing chamber 1216. Further, the check valves 1248 and 1250 impede flow of the solvent from the mixing chamber 1216 to the second section 1246, and from the second section 1246 to the solvent container 1204.

In light of the above description of the components of the fiber-optic endface cleaning apparatus 1200, the operation of the endface cleaning apparatus will now be described. To begin operation, the actuation mechanism 1232 is depressed by a user in the direction of the arrow indicated by reference numeral 1234. Pressing the actuation button in the direction of arrow 1234 causes a corresponding motion of attached piston 1228 such that the first passageway 1212 is no longer obstructed by the piston 1228. Thus, pressurized fluid flows from the pressurized fluid container 1202, through the first passageway 1212, into the mixing chamber 1216, and is discharged upon the endface.

As the actuation mechanism 1232 is pressed further in the direction of arrow 1234, the actuation button 1232 contacts the piston 1238 of the solvent metering mechanism 1226, initiating movement of the solvent metering mechanism 1226 in the direction of arrow 1234. This causes a pressure increase in the solvent contained in a solvent metering cavity 1260 of the second section 1246. The solvent metering cavity 1260 is defined for the illustrated embodiment as the portion of the second section 1246 bounded by the step 1256 at one end, the piston 1238 at an opposing end, the inner wall of the second section 1246 of the control system bore 1218, and the outer surface of the main body 1236 of the solvent metering mechanism 1226. The pressure increase in the solvent metering cavity 1260 causes the ball 1252 of the first check valve 1248 to lift off of its seat, allowing solvent to enter into the mixing chamber 1216. As the motion of the actuation mechanism 1232 stops, the pressure increase in the solvent metering cavity 1260 ceases, and the biasing device returns the ball 1252 of the first check valve 1248 to its seat, impeding the further flow of solvent into the mixing chamber 1216. However, the flow of pressurized fluid continues as the first passageway 1212 remains unobstructed.

The amount of solvent delivered into the mixing chamber 1216 is substantially equal to a volume of a solvent metering cavity 1260. Preferably, the predetermined volume of the solvent metering cavity 1260 is equal to between about 0.01 ml and about 0.05 ml, with a preferred volume of 0.025 ml.

When the actuation mechanism 1232 is partially released by the user, the movement of piston 1238 in the direction opposite arrow 1234 causes a vacuum to be created in the solvent metering cavity 1260. This vacuum lifts the ball 1252 of the second check valve 1250 and draws solvent into the solvent metering cavity 1260, preparing the endface cleaning apparatus 1200 for another cleaning cycle. As the actuation mechanism 1232 is completely released by the user, the piston 1228 of the fluid dispensing mechanism 1224 obstructs the first passageway 1212, cutting off the flow of pressurized fluid into the mixing chamber.

Focusing now on the timing of the flow of pressurized fluid and the solvent during operation, when a user initially depresses the actuation mechanism 1232, only the fluid dispensing mechanism 1224 is moved, partially un-obstructing the first passageway 1212. This permits pressurized fluid only to be directed upon the endface. As the actuation mechanism 1232 is pressed further in the direction of arrow 1234, the base of the actuation mechanism 1232 contacts the solvent metering mechanism 1226. This causes an increase in the pressure of the solvent contained within the solvent metering cavity 1260. This increase in pressure causes the first check valve 1248 to be actuated and a selective quantity of solvent to be released into the mixing chamber 1216. The pressurized fluid and solvent mix in the mixing chamber as they are conveyed along the mixing chamber and discharged out a nozzle 1254 of the endface cleaning apparatus 1200.

As the selected quantity of solvent is removed from the second section 1246 of the control system bore 1218 and dispensed upon the endface, the flow of pressurized fluid continues, continuing to displace and/or evaporate the solvent and contaminates from the endface. The flow of the pressurized fluid continues until the actuation mechanism 1232 is fully released.

The above process may be repeated until the endface is cleaned to within selected parameters. As should be apparent to those skilled in the art, during a cleaning operation, a blast of pressurized fluid only may be used to attempt to clean the endface. If this is unsuccessful in yielding satisfactory results, the endface cleaning apparatus 1200 may be used to deliver both the pressurized fluid and the solvent. Although an evacuation system is not depicted with the illustrated embodiment, it should be apparent to those skilled in the art that the endface cleaning apparatus 1200 may be modified to so include.

Figure 16:
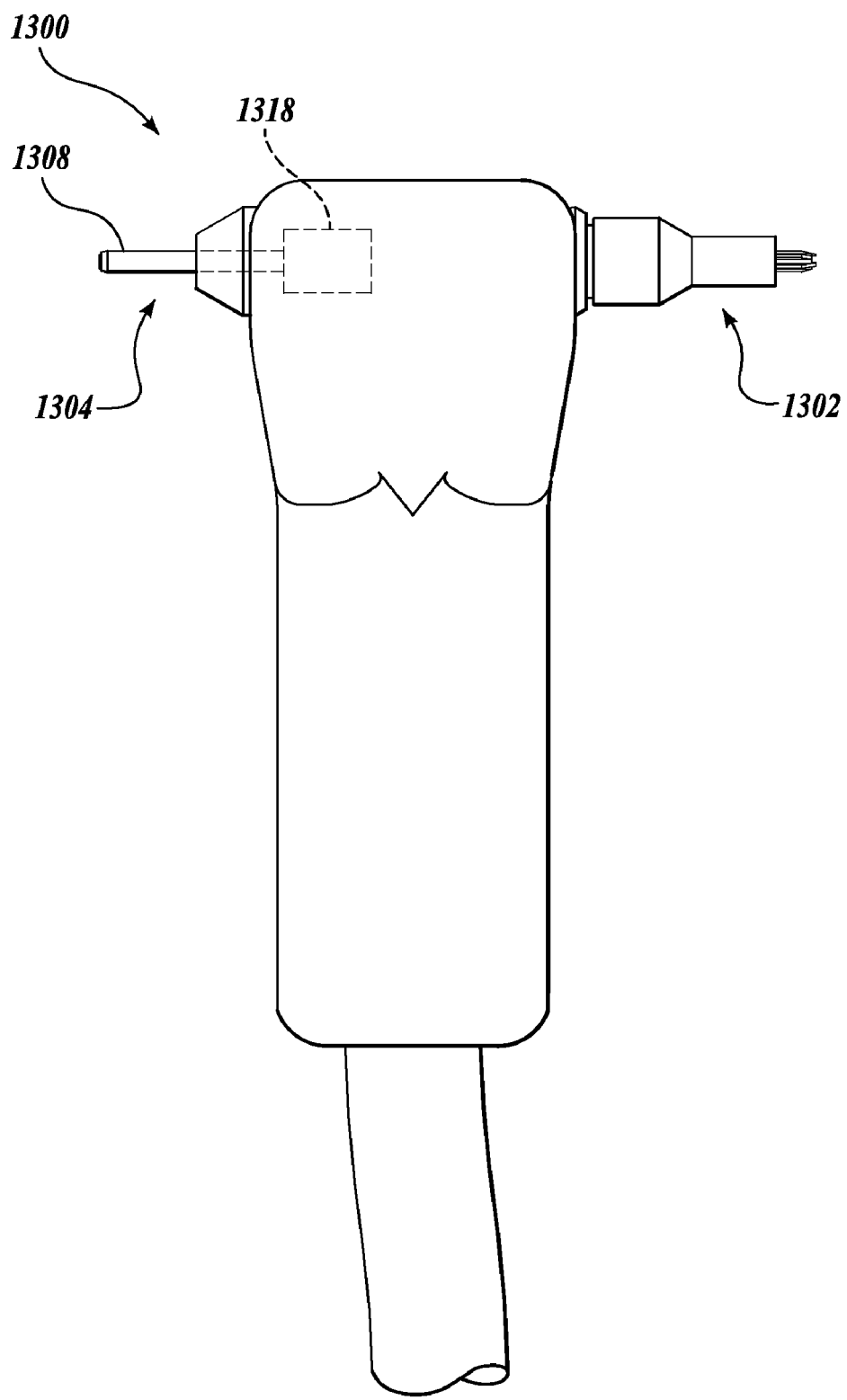
FIG. 16 is an elevation view of an alternate embodiment of a fiber-optic endface cleaning apparatus formed in accordance with the present invention, the endface cleaning apparatus including a fluid dispensing assembly facing a first direction and a contact cleaning assembly facing in an opposite direction.
Figure 17:
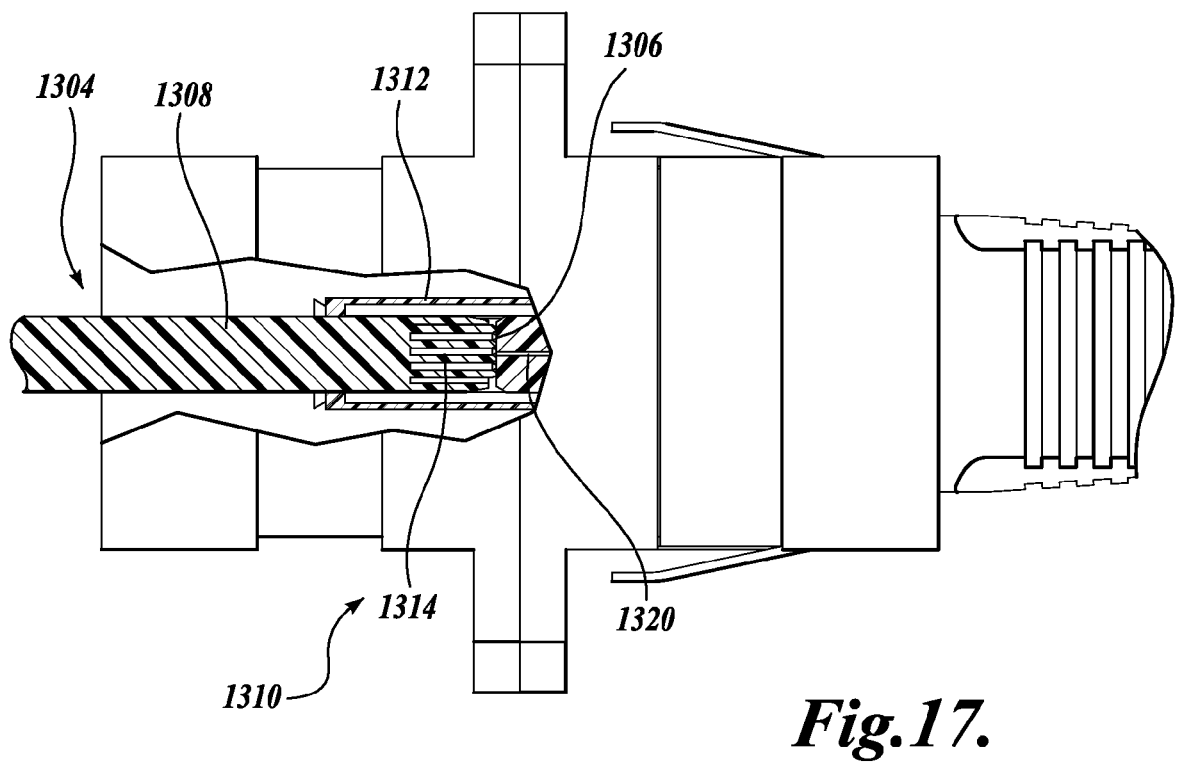
FIG. 17 is an elevation view of an engagement member of the contact cleaning assembly of FIG. 16 engaging a fiber-optic endface, the fiber-optic endface disposed within an alignment sleeve of an interface device, a portion of the interface device removed to reveal the endface, alignment sleeve, and a portion of the contact cleaning assembly, all shown in cross-section.
Figure 18:
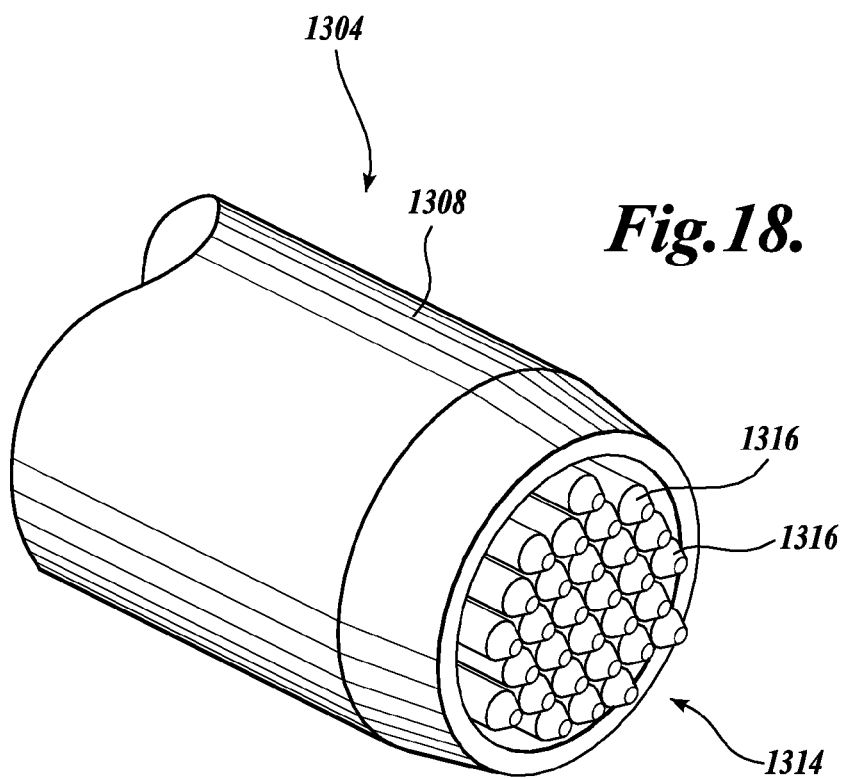
FIG. 18 is a perspective view of the engagement member of the contact cleaning assembly shown in FIGS. 16 and 17.

Referring now to FIGS. 16-18, an alternate embodiment of a fiber-optic endface cleaning apparatus 1300 formed in accordance with the present invention will now be described. The fiber-optic endface cleaning apparatus 1300 includes a fluid dispensing assembly 1302 which is substantially similar in operation and construction to the fluid dispensing assembly of the embodiment depicted in FIG. 13, and therefore will not be described in detail herein for the sake of brevity. The fiber-optic endface cleaning apparatus 1300 of this embodiment varies mostly from that depicted in FIG. 13 in that the endface cleaning apparatus 1300 includes a contact cleaning assembly 1304. The contact cleaning assembly 1304 is adapted to engage and clean a fiber-optic endface 1306 through physical contact.

More specifically, the contact cleaning assembly 1304 includes an interface portion 1308, the interface portion 1308 adapted to be received within an interface device 1310, such as the interface device 1103 depicted in FIG. 13. Preferably, the interface portion 1308 is sized and configured to be received within an alignment sleeve 1312 of the interface device 1310.

The contact cleaning assembly 1304 includes an engagement member 1314 coupled to the interface portion 1308, the engagement member 1314 adapted to engage the endface 1306 and remove contaminates on the endface 1306, such as embedded or pressed on contaminates, through physical contact. For the purposes of this detailed description, physical contact is defined as contact between a solid material and a contaminate on the endface. Therefore, the definition of physical contact as defined herein does not include the contact between a liquid or gas alone and a contaminate on the endface.

The contact cleaning assembly 1304 includes a driver 1318. The driver 1318 is coupled to the interface portion 1308 or alternately, the engagement member itself, and is operable to move the engagement member 1314 upon the endface 1306 to dislodge and/or remove any contaminates present on the endface 1306. The driver 1318 may be any suitable mechanism for moving the engagement member, such as a motor or a solenoid. In the illustrated embodiment, the driver 1318 is a motor operable to rotate (spin) the engagement member 1314 about an axis substantially collinear with the center axis of the optical fiber 1320.

Although in the illustrated embodiment the engagement member 1314 is described as being moved relative to the endface in a rotating manner, it should be apparent to those skilled in the art that alternate modes of movement are suitable for use with the illustrated embodiment and are within the spirit and scope of the present invention. For instance, the driver 1318 may move the engagement member 1314 along the endface in a linear, side to side motion, orbital motion, random motion, or may spin the engagement member 1314 in an axis other than the axis of the optical fiber 1320, such as one perpendicular to the axis of the optical fiber 1320. Further, a driver 1318 is depicted for moving the engagement member, it should be apparent to those skilled in the art that the engagement member 1314 may be manually moved by the operator.

In the illustrated embodiment, the engagement member 1314 is comprised of a plurality of brush bristles 1316 formed from a material that is preferably softer than the material of the endface 1306, such as plastic, to impede scratching of the endface 1306. Although the engagement member 1314 is illustrated and described as being comprised of a plurality of bristles 1316, it should be apparent to those skilled in the art that the engagement member 1314 may be formed from other materials, preferably solid materials operable to contact the endface without causing significant damage to the endface, such as fibrous materials, fabrics, foams, etc.

The interface portion 1308 of the contact cleaning assembly 1304 may be removably attached to the endface cleaning apparatus 1300. Thus, the interface portion 1308 may be removed and interchanged with an alternately shaped interface portion (not shown) adapted to be received within an alternately shaped interface device (not shown). Likewise, the engagement member 1314 may be removably attached to the endface cleaning apparatus 1300. Thus, the engagement member 1314 may be removed and interchanged with an alternately shaped engagement member (not shown) adapted to be received within an alternately shaped interface device (not shown).

In light of the above description of the components of the endface cleaning apparatus 1300, the operation of the endface cleaning apparatus 1300 will not be described. In a preferred mode of operation, the fluid dispensing assembly 1302 is interfaced with an interface device and operated as described for the endface cleaning apparatus 1100 depicted and described in relation to FIG. 13. If the application of the fluid and solvent was incapable of removing all contaminates from the endface, then the endface cleaning apparatus 1300 may be rotated 180 degrees and the contact cleaning assembly 1304 interfaced with the interface device. More specifically, the user inserts the interface portion 1308 of the contact cleaning assembly 1304 within the interface device such that the engagement member 1314 engages the endface. The engagement member 1314 is moved across the endface by the spinning motion imparted by the driver 1318, such that the bristles 1316 of the engagement member 1314 engage and dislodge any contaminates present on the endface. The contact cleaning assembly 1304 may then be removed from the interface device. The fluid dispensing assembly 1302 is then re-interfaced with the interface device, and the endface cleaned by application of the fluid and solvent, removing any contaminates dislodge through the contact cleaning assembly 1304. This process is continued until the endface is cleaned to within specifications.

Figure 19:
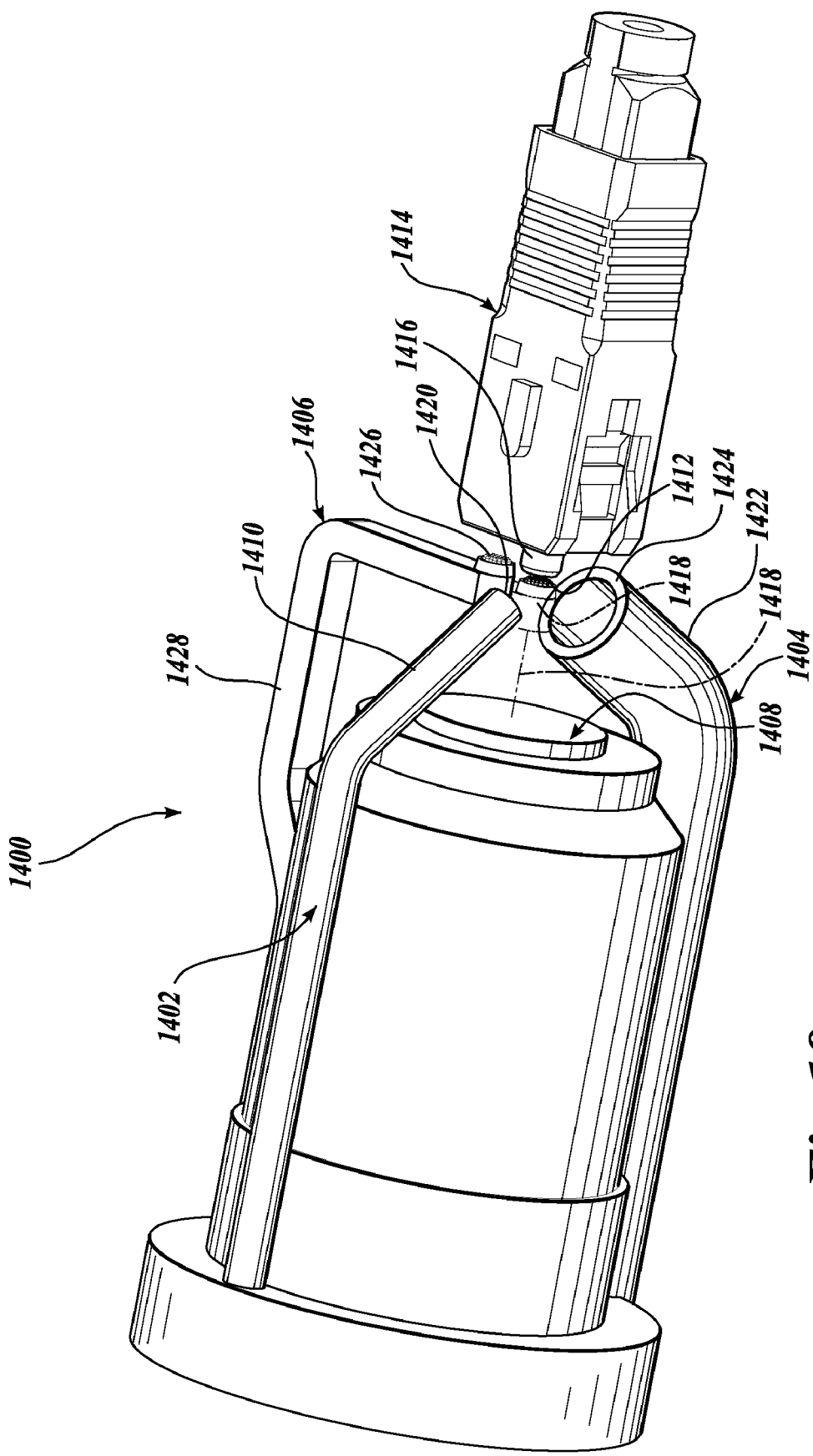
FIG. 19 is a perspective view of an alternate embodiment of a fiber-optic endface cleaning apparatus, the fiber-optic endface cleaning apparatus including a contact cleaning assembly, a fluid dispensing assembly, an evacuation assembly, and a microscope, the endface cleaning apparatus shown in relation to an interface device.

Referring now to FIG. 19, an alternate embodiment of a fiber-optic endface cleaning apparatus 1400 formed in accordance with the present invention will now be described. The fiber-optic endface cleaning apparatus 1400 includes a fluid dispensing assembly 1402, an evacuation assembly 1404, a contact cleaning assembly 1406, and a endface viewing device, such as a microscope 1408. Inasmuch as the fluid dispensing assembly 1402 is substantially similar to the fluid dispensing assembly depicted and described in relation to FIG. 13, the contact cleaning assembly 1406 is substantially similar to the contact cleaning assembly depicted and described in relation to FIGS. 16-18; and the microscope 1406 is substantially similar to the microscope depicted and described in relation to FIGS. 3-4, this detailed description will focus only on the differences between the components of this embodiment not previously described in the above described embodiments.

The microscope 1408 of the endface cleaning apparatus 1400 is designed and configured to view a fiber-optic endface 1412 to aid a user in determining the optical clarity of the endface 1412, i.e. to determine if the endface 1412 is damaged or to determine whether or not contaminates are present on the endface 1412 which may degrade the performance of the optical fiber 1416. A pathway is maintained free of obstructions between the microscope 1408 and the endface 1412 such that an optical imaging axis 1418 of the microscope 1408 may reach unobstructed the endface 1412 of an interface device 1414. Since the optical features of the microscope 1408 and the general knowledge of the optical nature of the microscope 1408 are well known, these aspects of the microscope 1408 will not be further discussed herein.

The fluid dispensing assembly 1402 includes a fluid passageway 1410 for containing and directing a mixture of a pressurized fluid and a solvent upon the endface 1412 of the interface device 1414, such as the optical fiber connector depicted. The fluid passageway 1410 terminates in a nozzle tip 1420. The fluid passageway 1410 and nozzle tip 1420 are positioned to be disposed out of the way of the optical imaging axis 1418 so as not to impede and or obstruct the viewing of the endface 1412 by the microscope 1408.

The evacuation system 1404 includes a vacuum passageway 1422 for containing and directing a vacuum upon the endface 1412. The vacuum passageway 1422 terminates in a nozzle tip 1424. The vacuum passageway 1422 and nozzle tip 1424 are positioned to be disposed out of the way of the optical imaging axis 1418 so as not to impede and or obstruct the viewing of the endface 1412 by the microscope 1408.

In the illustrated embodiment, the contact cleaning assembly 1406 includes an actuation member 1428. The actuation member 1428 is formed from an elongate arm, wherein an engagement member 1426 is disposed upon a distal end of the elongate arm. The actuation member 1428 is configurable between a first position, wherein the actuation member 1428 is shown in solid lines, and in a second position, wherein the actuation member 1428 is shown in phantom.

In the first position, the actuation member 1428 is disposed such that the contact cleaning assembly 1406 is displaced away from the optical image axis 1418 of the microscope 1408. Therefore, when the actuation member 1428 is in the first position, the contact cleaning assembly 1406 is disposed out of the way of the optical imaging axis 1418 so as not to impede and or obstruct the viewing of the endface 1412 by the microscope 1408.

In the second position, the actuation member 1428 is disposed such that the engagement member 1426 of the contact cleaning assembly 1406 is in engagement with the endface 1412 such that the engagement member 1426 may physically contact the endface 1412 to aid in removing contaminates therefrom. The actuation member 1428 may be actuated between the first and second positions by any well known means in the art, such as by an electrical, air, mechanical, hydraulic or other type of actuator, or by manual manipulation by the user.

The contact cleaning assembly 1406 includes the engagement member 1426, the engagement member adapted to engage and remove contaminates from the endface 1412 through physical contact. The engagement member 1426 may be any material operable to contact the endface without causing significant damage to the endface 1412. As described for the embodiment depicted in FIGS. 16-18, the contact cleaning assembly 1406 may include a driver (not shown) operable to move the engagement member 1426 upon the endface 1412 to dislodge and/or remove any contaminates present on the endface 1412. In the illustrated embodiment, the driver is operable to move the engagement member across the endface of the optical fiber.

Although in the illustrated embodiment, the engagement member 1426 is described as being moved across the endface, it should be apparent to those skilled in the art that alternate modes of movement are suitable for use with the illustrated embodiment and are within the spirit and scope of the present invention. For instance, the driver may move the engagement member 1426 along the endface in a side to side motion, linear motion, rotating motion, orbital motion, random motion, or may spin the engagement member 1426 in an axis other than one parallel with the optical fiber 1320, such as one perpendicular to the axis of the optical fiber 1320. Alternately, the engagement member 1426 may be manually manipulated.

In the illustrated embodiment, the engagement member 1426 is comprised of a plurality of brush bristles formed from a material that is preferably softer than the material of the endface 1412, such as plastic. Although the engagement member 1426 is illustrated and described as being comprised of a plurality of bristles, it should be apparent that the engagement member 1426 may be formed from other materials, and preferably non-abrasive materials, such as fibrous materials, fabrics, foams, solid materials, etc.

In operation, a preferred manner of use is to steadily increase the aggressiveness of the cleaning operations until the endface is clean. For instance, a user may first examine the endface to determine if the endface requires cleaning. If the endface does require cleaning, a vacuum may be applied to try to remove any contaminates from the endface. If this is not successful, a blast of pressurized fluid only may be applied in a further attempt to clean the endface. If this is not successful, a blast of fluid with solvent mixed therein may be applied to clean the endface. If this is not successful, the engagement member may be actuated to engage and clean the endface, accompanied by fluid and/or solvent or without accompanying fluid and/or solvent. Conducting cleaning operations in this manner ensures that the least intrusive cleaning regime is used to clean the endface. Although a preferred manner of use is described and illustrated, it should be apparent to those skilled in the art that the manner of cleaning the endface may deviate from the preferred manner of cleaning described above without departing from the spirit and scope of the present invention. For instance, a user may not follow a stepped approach, and apply the fluid, solvent, vacuum, and engagement member simultaneously as an initial step in the cleaning process.

Figure 20:
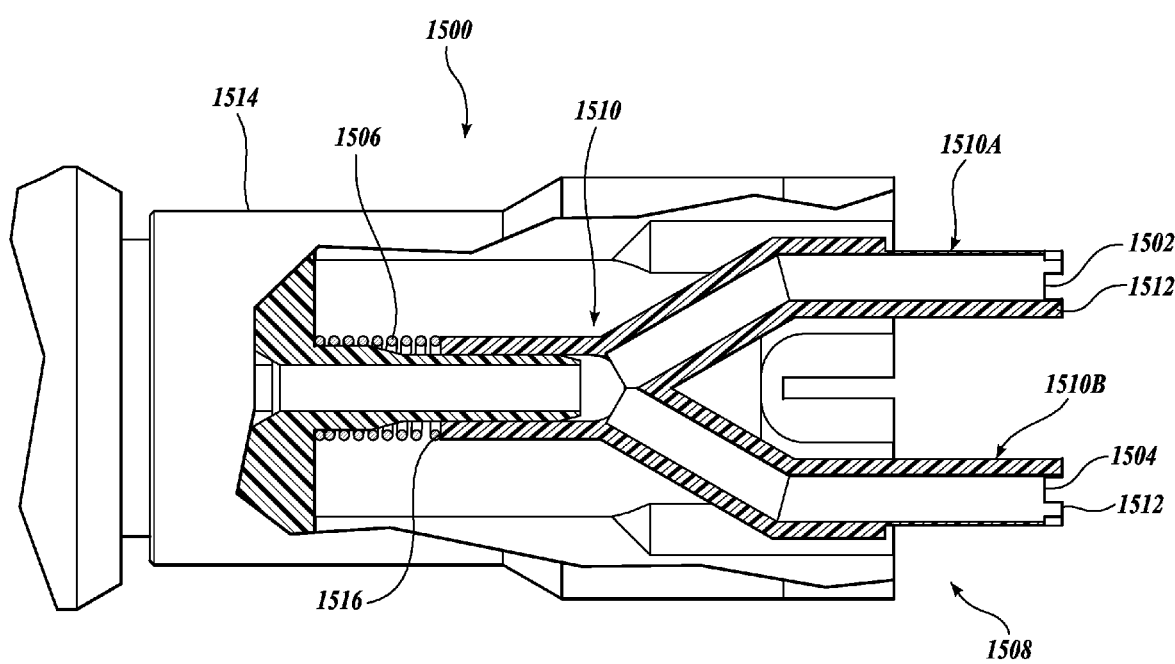
FIG. 20 is an elevation view of an alternate embodiment of a front section of a fiber-optic endface cleaning apparatus formed in accordance with the present invention and adapted to clean an interface having two endfaces disposed therein, the front section adapted to be selectively interchangeable with the front section of the endface cleaning assembly depicted in FIG. 13. A portion of the front section has been removed to show a fluid dispensing assembly housed therein, with a portion of the fluid dispensing assembly shown in cross-section.

Referring now to FIG. 20, an alternate embodiment of a fiber-optic endface cleaning apparatus 1500 formed in accordance with the present invention will now be described. Inasmuch as the endface cleaning apparatus 1500 is substantially similar to the endface cleaning apparatus depicted and described in relation to FIGS. 13 and 14, this detailed description will only focus on the differences between the components of this embodiment not previously described above. Generally, these differences include the inclusion of multiple nozzle tips 1502 and 1504 for engaging and/or cleaning two fiber-optic endfaces (not shown) simultaneously or in succession without removing the endface cleaning apparatus 1500 from the interface device (not shown). Further, the nozzle tips 1502 and 1504 are biased toward the endfaces by a biasing device 1506, which in the illustrated embodiment, is a spring.

Referring to FIGS. 1 and 20, the endface cleaning apparatus 1500 of FIG. 20 is adapted to interface with an interface device having a plurality of endfaces disposed therein, such as the interface device shown in FIG. 1, the interface device including a fiber-optic bulkhead adapter 200 and a pair of fiber-optic connectors 214 and 216. More specifically, a fluid dispensing assembly 1508 of the endface cleaning apparatus 1500 is adapted to simultaneously engage and dispense a pressurized fluid and solvent upon each of the endfaces disposed within the interface device. To accomplish this, the endface cleaning apparatus includes a branched interface portion 1510, such that the interface portion 1510 includes a first interface portion 1510A and a second interface portion 1510B. The first interface portion 1510A is configured to be received by the first female input 204 of the fiber-optic bulkhead adapter 200 and the second interface portion 1510B is configured to be received by the second female input 206 of the fiber-optic bulkhead adapter 200. Thus, during operation, the endfaces contained within the each of the female inputs 204 and 206 may be simultaneously cleaned.

Although the fluid dispensing assembly 1508 of the endface cleaning apparatus of FIG. 20 is depicted and described as having two nozzle tips 1502 and 1504, it should be apparent to those skilled in the art that the endface cleaning apparatus 1500 may alternately have any number of nozzle tips, including 1 and all numbers greater. Further, although the endface cleaning apparatus of FIG. 20 is depicted and described as simultaneously cleaning both endfaces, it should be apparent that the endface cleaning apparatus may suitably adapted to clean the endfaces in succession to one another, rather than simultaneously, without departing from the spirit and scope of the present invention.

In the illustrated embodiment, the interface portion 1510 is biased outward, toward a fiber-optic endface such that when extensions 1512 of the nozzle tips 1502 and 1504 engage the endfaces, the interface portion 1510 may be displaced in the direction of the endface cleaning apparatus 1500, i.e. away from the endfaces. Thus, with this configuration, the separation distance between the endfaces and the nozzle tips 1520 is maintained, despite movement between the interface device and the endface cleaning apparatus 1500. Further, a selected engagement force between the interface portion 1510 of the fluid dispensing assembly 1508 and the fiber-optic endfaces is maintained during engagement of the extensions 1512 with the endfaces. This, among other things, aids in impeding damage to the endfaces through the extensions 1512 exerting excessive force upon the endfaces. In the illustrated embodiment, the interface portion 1510 is biased toward the endfaces by a spring 1506, the spring extending between a portion of a housing 1514 of the endface cleaning apparatus 1500 and a base 1516 of the interface portion 1510. However, it should be apparent to those skilled in the art that alternate biasing means are suitable for use with and within the spirit and scope of the present invention.

Figure 21:
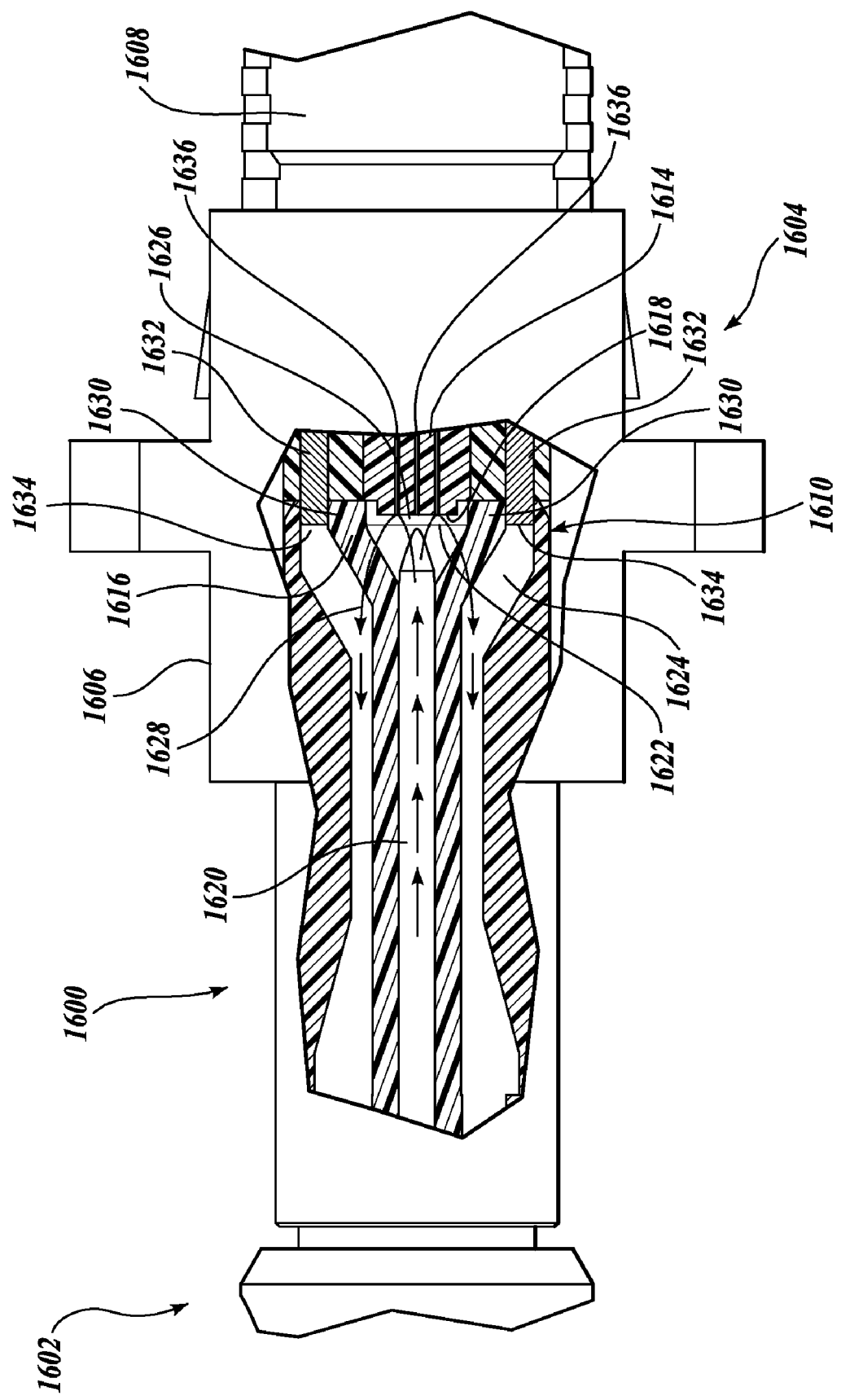
FIG. 21 is an elevation view of an alternate embodiment of a front section of a fiber-optic endface cleaning apparatus formed in accordance with the present invention and adapted to clean a ribbon connector, the front section adapted to be selectively interchangeable with the front section of the endface cleaning assembly depicted in FIG. 13. A portion of the front section has been removed to show a fluid dispensing assembly housed therein, with a portion of the fluid dispensing assembly and a ribbon ferrule shown in cross-section.

Referring now to FIG. 21, an alternate embodiment of a front section 1600 formed in accordance with the present invention will now be described. The front section 1600 is suitable to removably attach to the threaded joint 1119 of the endface cleaning apparatus 1100 depicted and described in relation to FIG. 13. The front section 1600 is adapted to clean a plurality of fiber-optic endfaces associated with a plurality of optical fibers 1636. The optical fibers 1636 are partially contained within a ribbon connector 1608 associated with an interface device 1604, the interface device also including a bulkhead adapter 1606. Inasmuch as the front section 1600 is substantially similar in operation and structure to the front section 1115 of the endface cleaning apparatus 1100 depicted and described in relation to FIGS. 13 and 14, this detailed description will only focus on the differences between the components of this embodiment not previously described in the above described embodiments.

Generally, these differences include the modification of an interface portion 1610 of a fluid dispensing assembly for or cleaning fiber-optic endfaces (not shown) associated with the ribbon connector 1608 disposed within the interface device 1604. More specifically, the well known ribbon connector 1608 includes a "flat" or rectangular ferrule 1614 having a plurality of fiber-optic endfaces disposed therein. The interface portion 1610 of the fluid dispensing assembly includes a cooperatively shaped tip portion 1616 adapted to terminate in proximity to the distal end 1618 of the ferrule 1614. More specifically, the tip portion 1616 terminates in a nozzle 1622 disposed about 20 thousands of an inch from the distal end 1618 of the ferrule 1614, creating a gap 1626 between the distal end 1618 of the ferrule 1614 and the tip portion 1616. The approximately 20 thousands of an inch separation distance formed by the gap 1626 is maintained by two posts 1630 which engage the connector 1608.

The ribbon connector 1608 may include two alignment pins 1632 which extend outward from the connector 1608. The interface portion 1610 may include two pin receiving portions 1634 adapted to receive the alignment pins 1632. The interface portion 1610 may further include a vacuum passageway 1624 disposed around the tip portion 1616. The vacuum passageway 1624 is coupled to a well known vacuum source (not shown) such that at least a portion of the pressurized fluid and solvent dispensed by the fluid dispensing assembly 1612 from the nozzle 1622 passes through the gap 1626 and enter the vacuum passageway 1624 by flowing past the two posts 1630. The flow path of the pressurized fluid and solvent is indicated by the arrow designated by reference numeral 1628.

While certain aspects of the invention are depicted and associated with specific embodiments illustrated and described above, it should be apparent to those skilled in the art that aspects of one illustrated embodiment may be applied and suitable for use with other embodiments. For instance, any of the above embodiments may be adapted to include a microscope, a contact cleaning assembly, an evacuation system, interchangeable interface portions, biased interface portions, multiple interface portions, use various solvents and pressurized fluids, have removable pressurized fluid and/or solvent containers, etc. Likewise, although the embodiments depicted and described above are shown as having certain aspects, it should be apparent that they may be operated suitably without certain described aspects, such as without a microscope, a contact cleaning assembly, an evacuation system, interchangeable interface portions, biased interface portions, multiple interface portions, removable pressurized fluid and/or solvent containers, etc.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A cleaning apparatus fox cleaning an endface of an optical fiber comprising:
   (a) a housing;
   (b) a first attachment device coupled to the housing, the first attachment device adapted to permit the selective coupling of a container of fluid to the housing;
   (c) a second attachment device coupled to the housing, the second attachment device adapted to permit the selective coupling of a container of solvent to the housing;
   (d) a fluid dispensing assembly at least partially disposed within the housing and in fluid communication with each of the containers, the fluid dispensing assembly operable to deliver the fluid and the solvent from each of the containers upon the endface to aid in the removal of contaminants on the endface; and
   (e) a solvent metering mechanism having a solvent metering cavity of a predetermined volume, and an actuator mechanism coupled to the housing and contacting the solvent metering mechanism when the actuator mechanism is activated, any solvent contained in the solvent metering cavity being dispensed upon the endface when the actuator mechanism is activated.

2. The cleaning apparatus of claim 1, wherein the predetermined volume of the solvent metering cavity is about 0.01 ml to about 0.05 ml.

3. The cleaning apparatus of claim 1 further comprising a control system coupled to the housing, the control system configurable into a first position, wherein the fluid is permitted to be dispensed from the fluid dispensing assembly upon the endface and the solvent is impeded from being dispensed from the fluid dispensing assembly upon the endface.

4. The cleaning apparatus of claim 1 wherein the fluid dispensing assembly further comprises a nozzle tip, the fluid and the solvent being dispensed from the fluid dispensing assembly through the nozzle tip.

5. The cleaning apparatus of claim 4, further comprising at least one extension extending outward from the nozzle tip, the distal end of the extension adapted to engage the endface to maintain the nozzle tip at least a selected distance away from the endface.

6. The cleaning apparatus of claim 5, wherein the selected distance is about 0.015 to about 0.25 inches.

7. The cleaning apparatus of claim 1, wherein at least a portion of the fluid dispensing assembly is adapted to be inserted within an alignment sleeve.

8. The cleaning apparatus of claim 1, further comprising a microscope coupled to the housing, the microscope being adaptable to view the endface.

9. The cleaning apparatus of claim 1, further comprising a biasing device, the biasing device interacting with the fluid dispensing assembly to bias at least a portion of the fluid dispensing assembly toward the endface.

* * * * *